(12) United States Patent  
Kanou

(10) Patent No.: US 8,376,372 B2  
(45) Date of Patent: Feb. 19, 2013

(54) MULTIPLE WHEEL VEHICLE

(76) Inventor: Kinya Kanou, Osaka (JP)

( * ) Notice: Subject to any disclaimer, the term of this patent is extended or adjusted under 35 U.S.C. 154(b) by 0 days.

(21) Appl. No.: 13/141,172

(22) PCT Filed: Jan. 12, 2010

(86) PCT No.: PCT/JP2010/050220  
§ 371 (c)(1),  
(2), (4) Date: Jun. 21, 2011

(87) PCT Pub. No.: WO2010/092846  
PCT Pub. Date: Aug. 19, 2010

(65) Prior Publication Data  
US 2011/0254238 A1  Oct. 20, 2011

(30) Foreign Application Priority Data

Feb. 16, 2009  (JP) .................................. 2009-032374

(51) Int. Cl.  
*B62D 9/02* (2006.01)  
*B60G 21/05* (2006.01)  
(52) U.S. Cl. .............. 280/5.509; 180/210; 280/124.103; 280/62  
(58) Field of Classification Search ................. 280/5.52, 280/5.509, 6.15, 62, 93.51, 124.103, 124.106, 280/124.107; 180/210  
See application file for complete search history.

(56) References Cited

U.S. PATENT DOCUMENTS 3,575,456 A * 4/1971 Austin ........................ 294/67.1  
4,003,443 A * 1/1977 Boughers .................... 180/217

(Continued)

FOREIGN PATENT DOCUMENTS

JP  5-139357 A  6/1993  
JP  9-207856 A  8/1997

(Continued)

OTHER PUBLICATIONS

International Search Report, dated Mar. 30, 2010, issued in PCT/JP2010/050220.

*Primary Examiner* — Joseph Rocca  
*Assistant Examiner* — Robert A Coker  
(74) *Attorney, Agent, or Firm* — Birch, Stewart, Kolasch & Birch, LLP

(57) ABSTRACT

A multiple wheel vehicle according to the present invention enables to incline freely the two wheels together with the vehicle body while keeping the ground contacting pressures of the two wheels equal. The multiple wheel vehicle comprises a pair of swinging arms 4 each comprising one-side end portion supported pivotably with right and left support shaft portions 3A and an interlocking device 6 for interlocking them alternately up-and-down. The interlocking device 6 comprises a pair of tilted members 17, a divertible member 19, and a cord-like body 20 connecting them. Each of the tilted members 17 comprises a first circular surface part 21 that has a center of a circular arc as a shaft center 3i of the support shaft portion 3A, and tiltably supported integrally with the swinging arm 4. The above-mentioned divertible member 19 is provided on the right and left and on one-side and another-side with one-side and another-side second circular surface parts 26 which has a center of the circular arc as a second shaft center 18i which is in the direction perpendicular to each of the above-mentioned first shaft centers 3i, respectively. The above-mentioned cord-like body 20 comprises one-side cord-like part 20L connecting the first and second circular surface parts 21 on the one-side and other-side cord-like part 20R connecting the first and second circular surface parts 21 on the other-side.

14 Claims, 24 Drawing Sheets

U.S. PATENT DOCUMENTS

| | | | |
|---|---|---|---|
| 4,375,293 A * | 3/1983 | Solbes | 280/22.1 |
| 4,484,648 A * | 11/1984 | Jephcott | 180/210 |
| 5,611,555 A * | 3/1997 | Vidal | 280/282 |
| 6,367,824 B1 * | 4/2002 | Hayashi | 280/62 |
| 7,731,210 B2 * | 6/2010 | Pedersen | 280/124.103 |
| 2008/0197597 A1 * | 8/2008 | Moulene et al. | 280/124.103 |

FOREIGN PATENT DOCUMENTS

| | | |
|---|---|---|
| JP | 3047816 U | 4/1998 |
| JP | 3079137 U | 8/2001 |
| JP | 2009-544516 A | 12/2009 |
| WO | WO 2008/012251 A1 | 1/2008 |

* cited by examiner

MULTIPLE WHEEL VEHICLE

TECHNICAL FIELD

The present invention relates to a multiple wheel vehicle comprising two wheels on a front wheel side and/or a rear wheel side, and the two-wheels are capable of inclining together with a vehicle body.

BACKGROUND ART OF THE INVENTION

As a three-wheels car comprising two wheels on a front wheel side, for example, a structure shown in FIG. 24 is known (see Patent Document 1, for example).

This is provided in a front arm (a) with right and left swinging arms (c) and (c) of which one-side end portion is pivoted via a support shaft (b), and a wheel (d) mounded on another-side end portion of each of the swinging arms (c). And, to divide a load acting on a front part of the car between the right and left wheels (d) and (d), the car comprises a balance lever (h) pivotally supported via a holding shaft (g) on an upper part of the above-mentioned front arm (a), and a movement-direction changing system (e) comprising a cushion spring (i) and (i) positioned between both edges of this balance lever (h) and the respective swinging arms (c).

When the one-side wheel (d) is pushed up from a road surface, the movement-direction changing system (e) tilts the balance lever (h) in the direction of pushing-up one-side of the balance lever (h) via the one-side swinging arm (c) and cushion spring (i). At this time, another-side cushion spring (i), swinging arm (c), and wheel (d) are pushed down at the same time by the tilting of the balance lever (h), so that the load acting on the one-side wheel (d) can be divided equally between the right and left wheels (d).

Therefore, for example, at the time of circling and turning with inclining a vehicle body and at the time of running on a widthwise sloping road surface and the like, it enables to incline freely the two wheels together with the vehicle body while keeping a ground-contacting-pressure of the two wheels equal and to improve a camber thrust, cornering property, and steering stability.

However, this largely limits an arrangement of the movement-direction changing system, so that there is a problem that possibility of designing becomes impaired. And, it is necessary to provide with the cushion spring in each of the swinging arms; therefore, there are also problems of increases in cost and weight.

Patent Document 1: Japanese Unexamined Patent Application Publication No. H5-139357.

DISCLOSURE OF INVENTION

Problem to be Solved by the Invention

It's an object of the present invention to provide a multiple wheel vehicle capable of keeping the aforementioned advantages, improving the possibility of designing, decreasing the number of suspensions such as a cushion spring by half, and improving the reductions in cost and in weight.

Means of Solving the Problems

To achieve the above-mentioned object, the invention according to claim 1 of the present application is a multiple wheel vehicle with two wheels on a front wheel side and/or a rear wheel side, characterized in that the multiple wheel vehicle comprises one-side and another-side swinging arms, wherein each of the swinging arms comprises
one-side end portion supported pivotably with each of right and left support shaft portions supported with a frame and extending on the same shaft center line and another-side end portion tilted up-and-down freely,
a wheel mounted on the other-side end portion of each of the one-side and other-side swinging arms, and
an interlocking device for interlocking the tilting motion of the one-side and other-side swinging arms alternately up-and-down;
the above-mentioned interlocking device comprises
a tilted member
comprising a first circular surface part which has a center of a circular arc as a first shaft center which is the shaft center of the above-mentioned support shaft portion and
fixed on the each swinging arm and enabling tilting around the first shaft center integrally with the swinging arm,
a change-direction member provided on the right and left and on one-side and another-side with one-side and another-side second circular surface parts, each of which has a center of the circular arc as a second shaft center which is in the direction perpendicular to each of the above-mentioned first shaft centers, and
a cord-like body comprising
one-side cord-like part connecting the first and second circular surface parts on the one-side and
another-side cord-like part connecting the first and second circular surface parts on the other-side;
each of the one-side and other-side cord-like parts comprises
a joint part extending in a z-axis direction perpendicular to the above-mentioned first and second shaft centers and extending along a tangential line of the first circular surface part and the second circular surface part,
a winding part connecting to the joint part and terminating by winding unwindably around the first circular surface part,
a twining part connecting to the joint part and twining around the second circular surface part; and
each of the above-mentioned twining part terminates by winding unwindably around each of the above-mentioned second circular surface part.

The invention according to claim 2 is the multiple wheel vehicle with two wheels on a front wheel side and/or a rear wheel side, characterized in that the multiple wheel vehicle comprises one-side and another-side swinging arms, wherein each of the swinging arms comprises
one-side end portion supported pivotably with each of right and left support shaft portions supported with a frame and extending on the same shaft center line and another-side end portion tilted up-and-down freely,
a wheel mounted on the other-side end portion of each of the one-side and other-side swinging arms, and
an interlocking device for interlocking the tilting motion of the one-side and other-side swinging arms alternately up-and-down;
the above-mentioned interlocking device comprises
a tilted member
comprising a first circular surface part which has a center of a circular arc as a first shaft center which is the shaft center of the above-mentioned support shaft portion and
fixed on the each swinging arm and enabling tilting around the first shaft center integrally with the swinging arm, a change-direction member provided on the right and left and on one-side and another-side with one-side and another-side second circular surface parts, each of which has a center of the circular arc as a second shaft center which is in the direction perpendicular to each of the above-mentioned first shaft centers, and a cord-like body comprising
one-side cord-like part connecting the first and second circular surface parts on the one-side and
another-side cord-like part connecting the first and second circular surface parts on the other-side;

each of the one-side and other-side cord-like parts comprises
a joint part extending in a Z-axis direction perpendicular to the above-mentioned first and second shaft centers and extending along a tangential line of the first circular surface part and the second circular surface part,
a winding part connecting to the joint part and terminating by winding unwindably around the first circular surface part,
a twining part connecting to the joint part and twining around the second circular surface part; and
the one-side and other-side twining parts interconnect each other.

The invention according to claim 3 is characterized in that the above-mentioned change-direction member comprises a single second shaft center, and circular surface parts formed on both sides of the center of circular arc around the second shaft center is defined as one-side and another-side second circular surface parts.

The invention according to claim 4 is characterized in that the above-mentioned change-direction member is supported tiltably around the above-mentioned second shaft center.

The invention according to claim 5 is characterized in that the above-mentioned the change-direction member is fixed disably-tilting.

The invention according to claim 6 is characterized in that the above-mentioned change-direction member comprises an oval-like body, which has two second shaft centers located on both right and left sides thereof, and comprises
a one-side second circular surface part being defined as a circular surface part formed around one-side second shaft center on one side of the right and left sides of the center of circular arc, and
another-side second circular surface part defined as a circular surface part formed around another-side second shaft center on another side of the right and left sides of the center of circular arc.

The invention according to claim 7 is characterized in that the oval-like body forming the above-mentioned change-direction member is fixed disably-tilting.

The invention according to claim 8 is characterized in that the change-direction member comprises two second shaft centers located on both right and left sides thereof, and the change-direction member is made of two, one-side and other-side, disk-like bodies having the one-side and other-side second shaft centers are defined as respective centers of the circular arc.

The invention according to claim 9 is characterized in that two disk-like bodies forming the above-mentioned change-direction member are pivotably supported around the respective second shaft centers tiltably.

The invention according to claim 10 is characterized in that two disk-like bodies forming the above-mentioned change-direction member are fixed around the respective second shaft centers disably tilting.

The invention according to claim 11 is characterized in that the one-side and other-side twining parts of the above-mentioned cord-like body are connected each other with a cushion spring.

The invention according to claim 12 is characterized in that the above-mentioned interlocking device comprises a suspension biasing the above-mentioned change-direction member in the Z-axis direction and in directing away from the above-mentioned first shaft center.

The invention according to claim 13 is characterized in that the above-mentioned cord-like body is made of a roller chain.

The invention according to claim 14 is characterized in that the above-mentioned roller chain comprises
a first bend part which is flexible in the direction along the above-mentioned first circular surface part and
a second bend part which is flexible in the direction along the above-mentioned second circular surface part, and
the first and second bend parts are connected with a joint link.

EFFECTS OF THE INVENTION

Since the vehicle according to the present invention comprises the above, when a one-side wheel is pushed up from a road surface, a one-side swinging arm and the tilted member tilt integrally around a first shaft centerline, and a one-side cord-like part is pulled in the direction of winding around a first circular surface. At this time, the change-direction member operates in a balance-like or pulley-like fashion and pulls the other-side cord-like part in the direction of rewinding from the first circular surface; therefore, it can push down the other-side wheel toward the road surface via the other-side tilted member and the swinging arm.

Consequently, the interlocking device can press down the other-side wheel in response to the pushing up of the one-side wheel with an equal force. Therefore, at the time of circling and turning about with inclining a vehicle body and at the time of running on a widthwise sloping road surface and the like, it enables to incline freely the two wheels together with the vehicle body while keeping a ground-contacting-pressure of the two wheels equal and to improve the camber thrust, cornering property, and steering stability.

The above-mentioned cord-like part extends in the z-axis direction perpendicular to the first and second shaft centers, and comprises a joint part extending along a tangential line of the first circular surface part and the second circular surface part. Therefore, in a tilting motion of the tilted member, the length of the joint part can be kept constant, a shifting of the cord-like part caused by the repetitive tilting motion can be prevented, and a reliable and smooth interlocking can be achieved.

In the interlocking device, when the tilted member is fixed on the swinging arm in enabling tilting integrally, the tilted member can be attached at a free phase angle (an angle around the first shaft center) with respect to the swinging arm. That is to say, the interlocking device can be provided in various positions and can highly enhance the possibility of designing of the multiple wheel vehicle.

EXPLANATION OF THE REFERENCE

Figure 1:
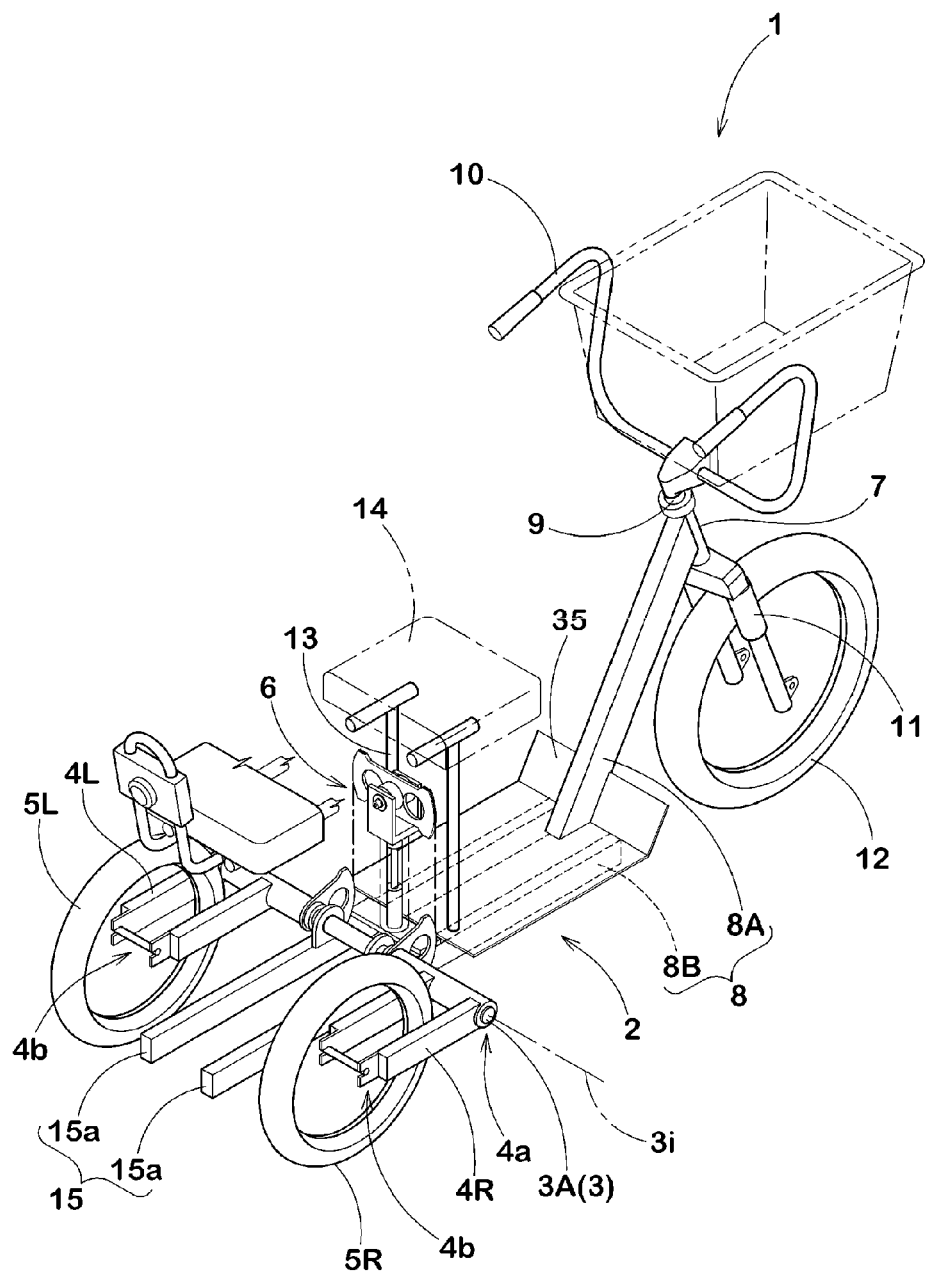
[FIG. 1] A perspective view of a multiple wheel vehicle showing an example of the present invention (an example of the multiple wheel vehicle comprising two wheels on a rear wheel side).
Figure 2:
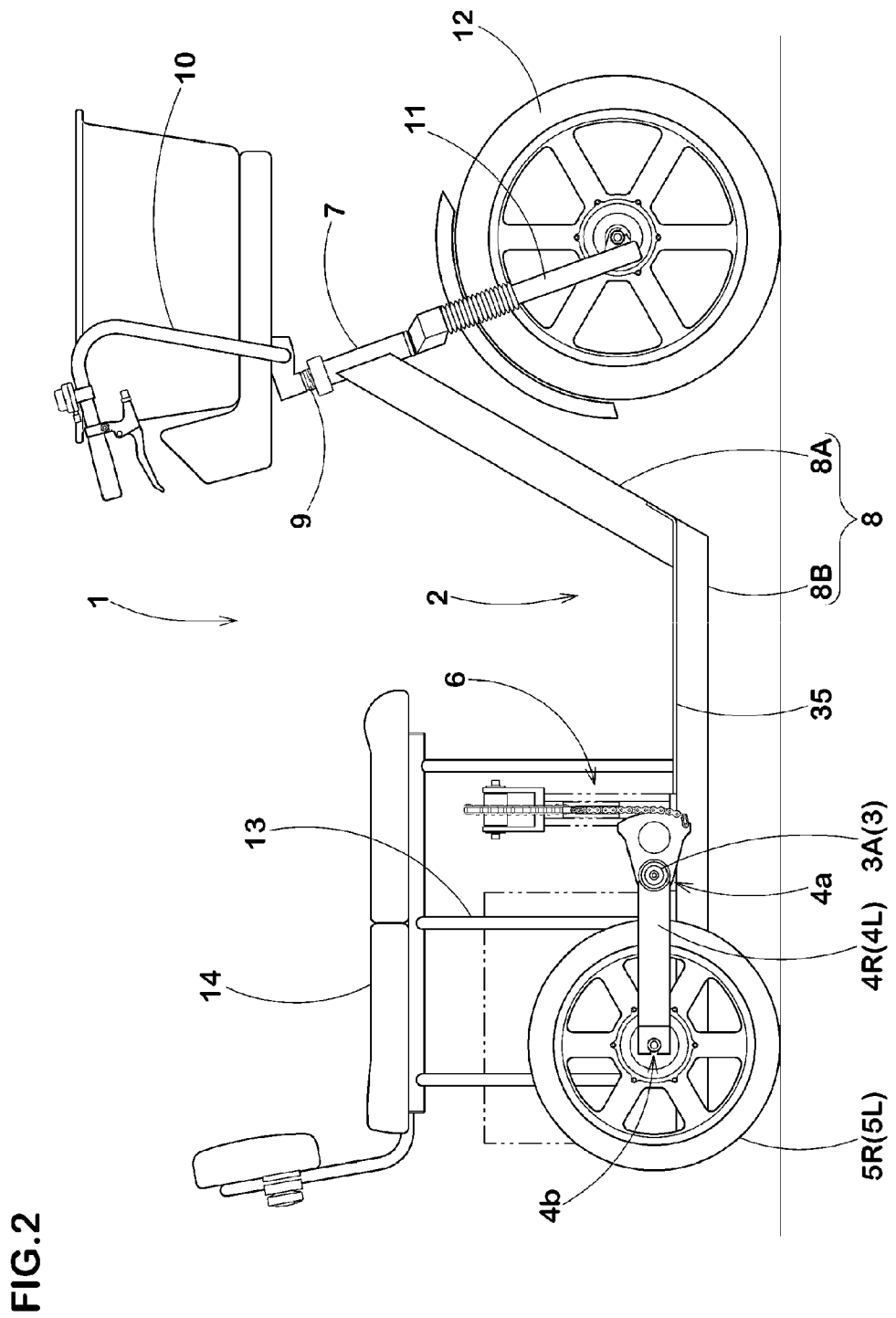
[FIG. 2] A side view thereof.

1 Multiple wheel vehicle
2 Frame
3A Support shaft portion
3$i$ First shaft center
4L, 4R swinging arms
4$a$ one-side end portion
4$b$ other-side end portion
5L, 5R wheels
6 interlocking device
17 Tilted member
18$i$ second shaft center
19 Change-direction member
20 cord-like body
20L, 20R cord-like parts
21L, 21R First circular surface parts
26L, 26R second circular surface parts
30 Joint part
31 First winding part
32 Twining part
33 Roller chain
33A First bend part
33B Second bend part
33$c$ Joint link
36 Suspension Best Mode for Carrying Out the Invention Hereinafter, embodiments of the present invention will be described in detail. As shown in FIG. 1, a multiple wheel vehicle 1 according to the present invention comprises:

one-side and another-side swinging arms 4L and 4R, wherein each of swinging arms comprises
one-side end portion 4$a$ supported pivotably with each of right and left support shaft portions 3A supported with a frame 2 of the skeleton of the vehicle and extending on the same shaft center line 3$i$;
wheels 5L and 5R mounted on the respective other-side end portions 4$b$ of the one-side and other-side swinging arms 4L and 4R; and
an interlocking device 6 for interlocking the one-side and other-side swinging arms 4L and 4R alternately up-and-down.

Incidentally, FIGS. 1 to 13 show a multiple wheel vehicle 1 having a two-rear-wheel type comprising two wheels on the rear wheel side (so-called a first embodiment). FIGS. 18 to 22 show a multiple wheel vehicle 1 having a two-front-wheel type comprising two wheels on the front wheel side (so-called a second embodiment).

In the first embodiment, the above-mentioned frame 2 has a well-known structure. The frame 2 comprises a frame body 8 extending back and forth and having a head pipe 7 fixed on a front end, and a steering shaft 9 kept freely turning with the head pipe 7. Incidentally, the steering shaft 9 is provided with a handlebar 10 on an upper end. And on a lower end of the steering shaft 9, a single wheel 12 forming a front wheel is mounted via front fork 11 in the present embodiment.

The above-mentioned frame body 8 comprises a front frame part 8A extending backward from the above-mentioned head pipe 7 in downward-sloping, and a substantially-horizontal rear frame part 8B extending backwardly in connection with the front frame part 8A. The frame body 8 is provided, in this embodiment, with a seat portion 14 via a sub-frame 13 rising from the rear frame part 8B. on the front side of the seat portion 14 and on a top surface of the rear frame part 8B, a broad floor panel portion 35 forming a footrest for a driver and a mudguard is provided. Incidentally, the rear frame part 8B is, in the present embodiment, is formed of a framing body 15 comprising double framing members 15$a$ made of squared pipes and extending back and forth in arranged right and left, for example. And, the rear frame part 8B supports a support shaft 3.

Figure 3:
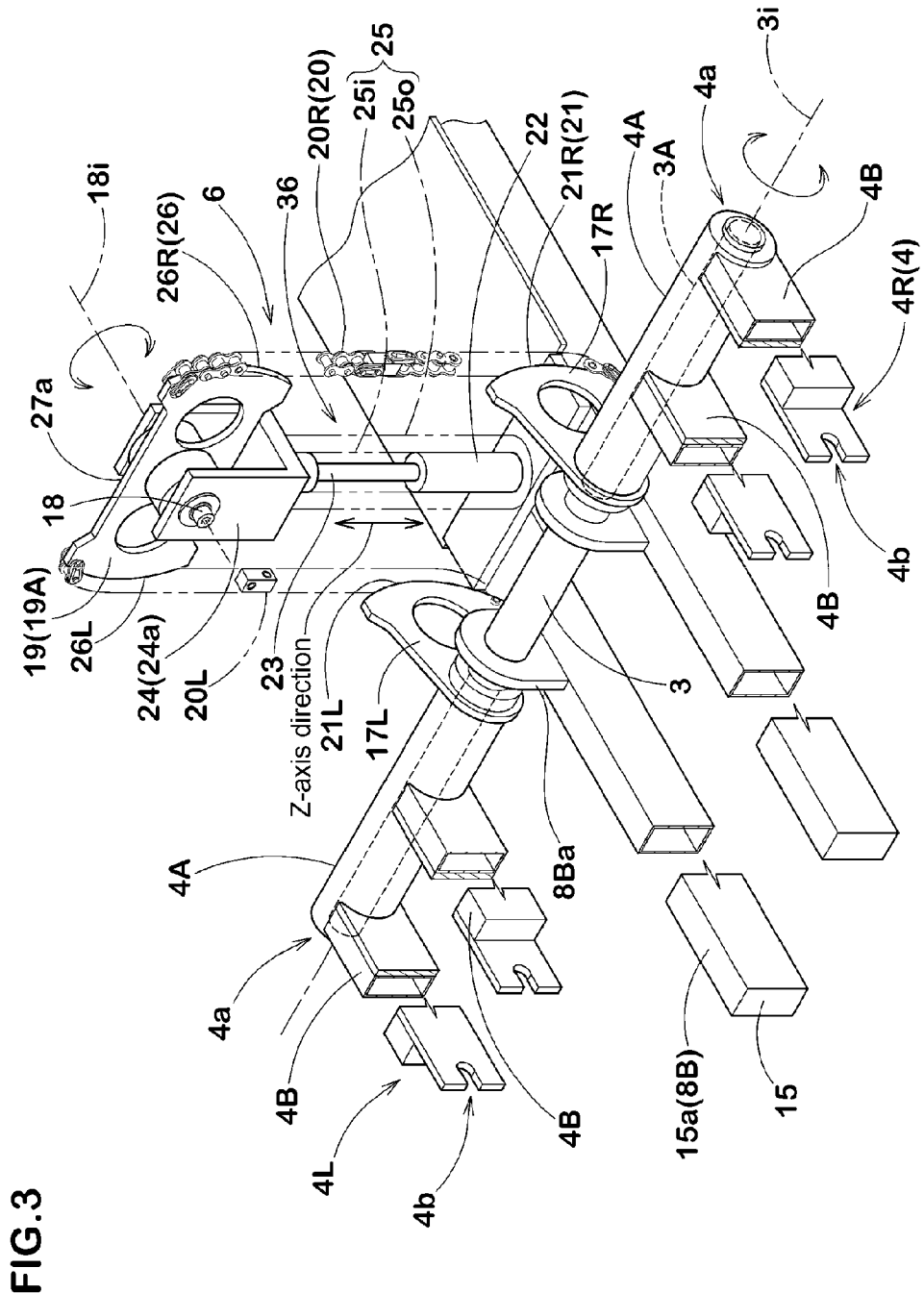
[FIG. 3] An enlarged perspective view of swinging arms with an interlocking device.

The support shaft 3 is as shown in FIG. 3, for example, a horizontal fixed axis fixed on a rear frame part 8B via a stand-piece 8B$a$ raising from the above-mentioned framing body 15. The both edges thereof comprise the support shaft portions 3A and 3A protruding right and left. In the support shaft portion 3A, a one-side end portion 4$a$ of each of the swinging arms 4L and 4R (in the present embodiment, a front end portion 4$a$) is pivoted. Therefore, in each of the swinging arms 4L and 4R, another-side end portion 4$b$ (in the present embodiment, a rear end portion 4$b$) can tilt up and down freely.

Each of the swinging arms 4L and 4R comprises a cylindrical pivot point 4A outserted on the above-mentioned support shaft portion 3A, and arm portions 4B extending backward from this pivot point 4A in two rows, for example. Incidentally, the pivot point 4A incorporates shaft-bearing members such as a bearing and the like to enforce the above-mentioned smooth tilting. On the rear end portion 4b of the above-mentioned swinging arms 4L and 4R, wheels 5L and 5R are mounted, respectively. In the present embodiment, each of the above-mentioned wheels 5L and 5R comprises a tire wheel 16 (shown in FIG. 5) having a built-in in-wheel motor (not shown). That is to say, the multiple wheel vehicle 1 of the present embodiment is formed as an electric-powered vehicle running with the respective wheels 5L and 5R drove by the in-wheel motor.

However, the multiple wheel vehicle can be formed as a so-called bicycle without an engine.

The above-mentioned interlocking device 6 comprises tilted members 17L and 17R fixed on the above-mentioned swinging arms 4L and 4R respectively, a change-direction member 19 in a balance-like or pulley-like fashion supported with the above-mentioned frame 2, and a cord-like body 20 interlocking between the one-side and other-side tilted members 17L and 17R via the change-direction member 19.

Each of the tilted members 17L and 17R comprises a first circular surface part 21 that has a center of a circular arc as a first shaft center 3i which is a shaft center of the above-mentioned support shaft portion 3A, and the tilted members are formed as a substantially fan-like body in the present embodiment. By being fixed on the respective swinging arms 4L and 4R, the tilted members 17L and 17R can be tilted integrally with the swinging arms 4L and 4R around the above-mentioned first shaft center 3i. In the present embodiment, the tilted members 17L and 17R are made of plates fixed on an inner end side of the above-mentioned pivot point 4A, and the end face thereof forms the above-mentioned first circular surface part 21.

Figure 4:
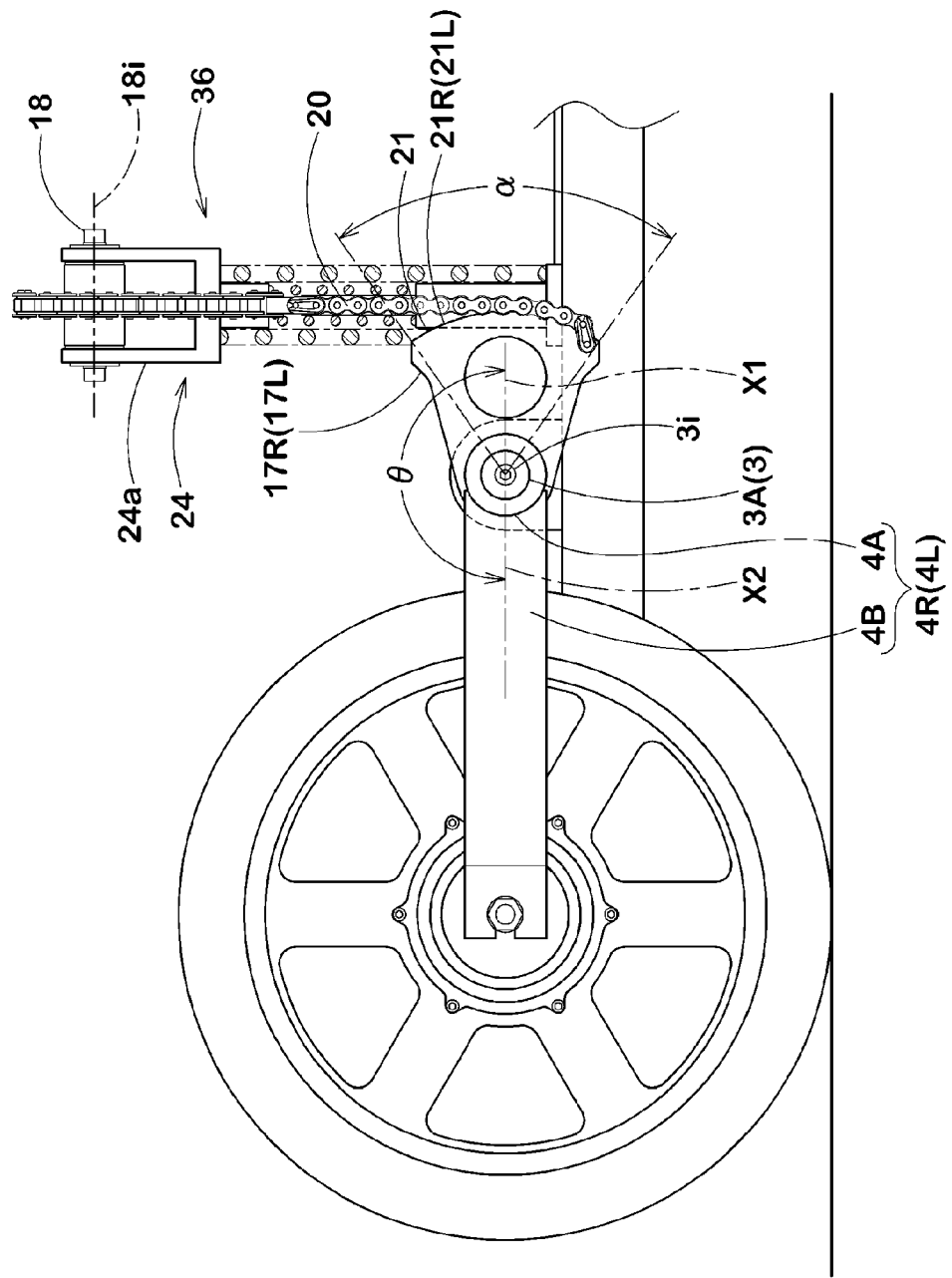
[FIG. 4] An enlarged side view of the swinging arms with the interlocking device.

As shown in FIG. 4, a phase angle of the tilted members 17L and 17R with respect to the swinging arms 4L and 4R (an angle theta ($\theta$) around the first shaft center 3i) is defined arbitrarily in accordance with a condition of design. More particularly, the angle theta ($\theta$) between a bisector x1 of a central angle alpha ($\alpha$) of the first circular surface part 21 and a line x2 in the longitudinal direction of the swinging arms 4L and 4R can be defined arbitrarily. In the present embodiment, the angle theta ($\theta$) is set to about 180 degrees, namely, the tilted members 17L and 17R counterpose to the swinging arms 4L and 4R on the both sides of the first shaft center 3i. In an envisioned general running, the central angle alpha ($\alpha$) is preferably in a range of from 20 to 60 degrees, for example. Incidentally, the tilted members 17L and 17R are not limited to a fan-like shape, but a disk-like shape, column-like shape, or cylindrical shape having the central angle alpha ($\alpha$) of the first circular surface part 21 of 360 degrees, for example, can be also adopted.

The above-mentioned change-direction member 19 is provided on the right and left and on the one-side and other-side with one-side and another-side second circular surface parts 26L and 26R which has a center of the circular arc as a second shaft center 18i which extends in the direction perpendicular to each of the above-mentioned first shaft centers 3i. The above-mentioned second circular surface parts 26L and 26R are the same in radius. In the present embodiment, the change-direction member 19 comprises a single second shaft center 18i, and the circular surface parts formed on both of the right and left sides of the center of circular arc around this second shaft center 18i is defined as the one-side and other-side second circular surface parts 26L and 26R so that the change-direction member 19A has a single circular arc.

Figure 14A:
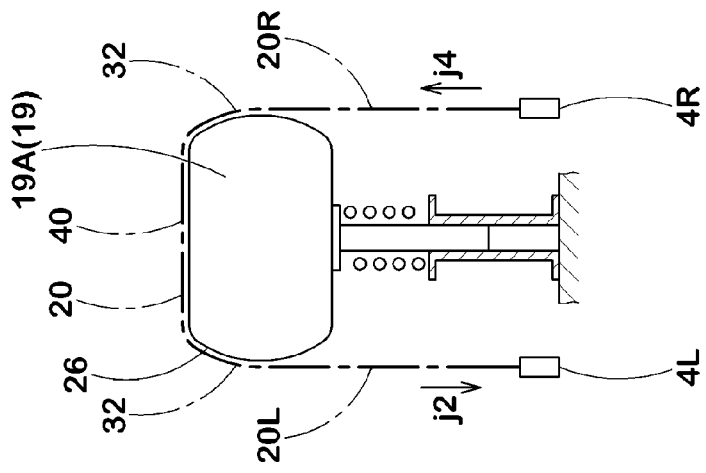
[FIGS. 14] (A) to (C) are front views conceptually showing an example of a change-direction member operating in a pulley-like fashion.
Figure 14B:
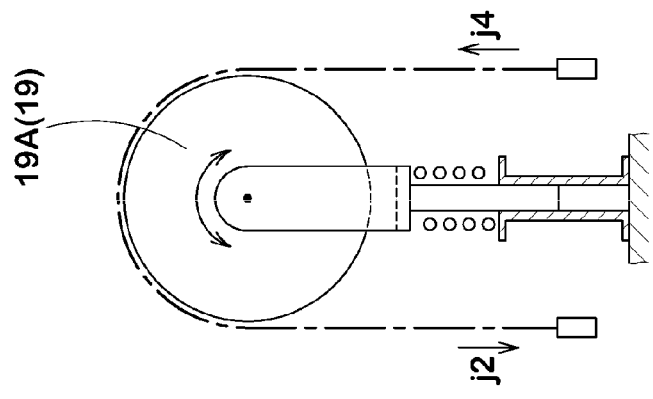
Figure 14C:
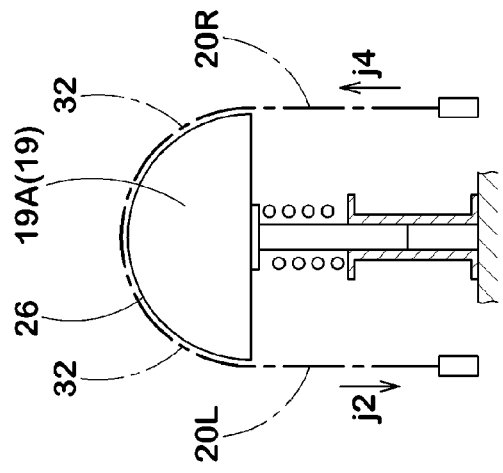

More particularly, the change-direction member 19A having the single circular arc in the present embodiment has a substantially oval-like body in which the second circular surface parts 26L and 26R are connected with a substantially-horizontal tie surface portion 27a so as to be horizontally long. These will allow the above-mentioned interlocking device 6 to downside and to reduce in weight. However, for the change-direction member 19A of the single circular arc, as shown in FIGS. 14 (B) and (c), a circular-like fashion in which the second circular surface parts 26L and 26R are connected each other with the same circular arc, and a semi-circle-like fashion in which the lower half thereof is removed and the like can be also adopted.

Figure 5:
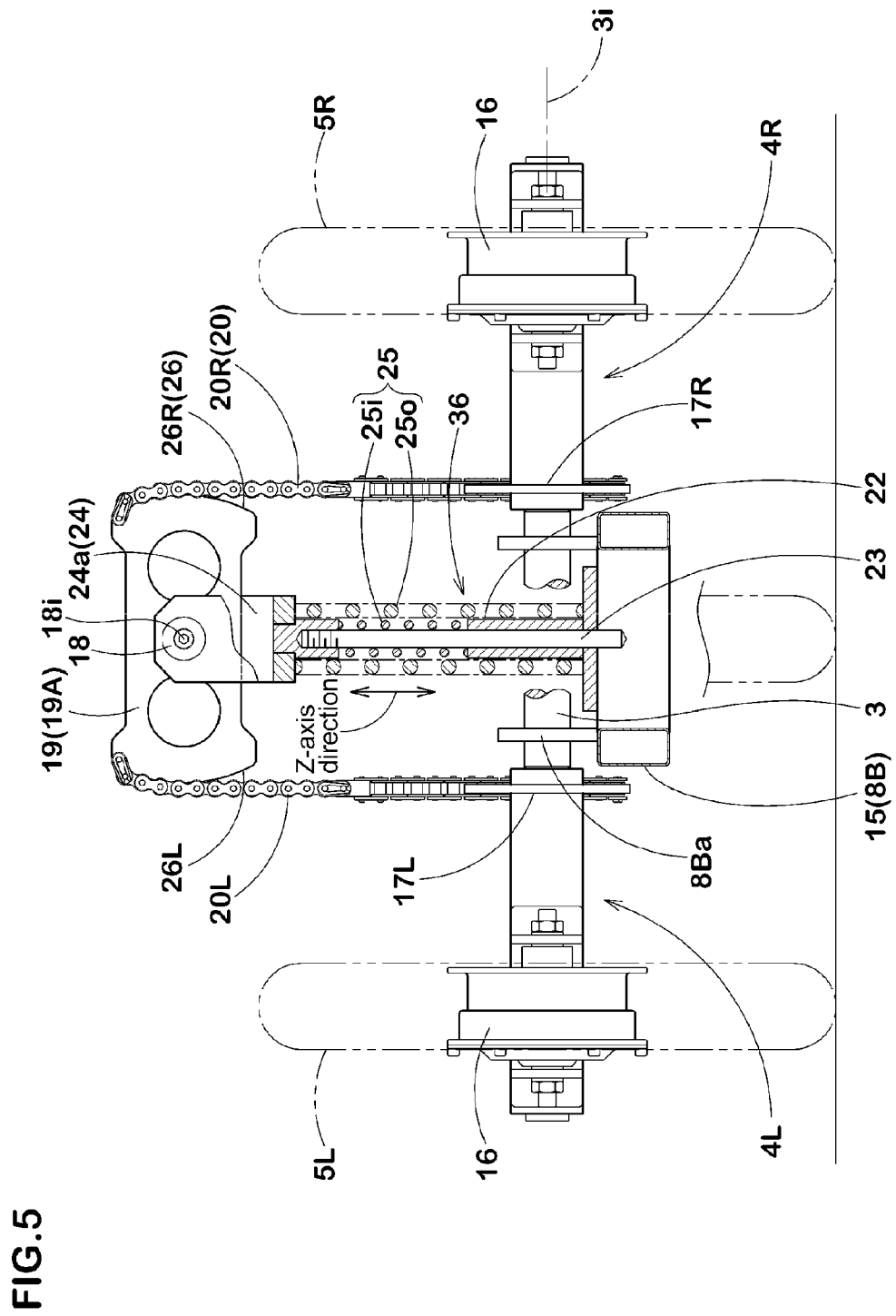
[FIG. 5] An enlarged back view of the swinging arms with the interlocking device.

The change-direction member 19A of the single circular arc in the present embodiment is pivotally supported around the above-mentioned second shaft center 18i tiltably. More particularly, the change-direction member 19A has the second shaft center 18i, and is pivoted on a holding shaft 18 supported with the above-mentioned frame 2 via a suspension 36. In the present embodiment, this suspension 36 is, as shown in FIGS. 3 and 5, arranged vertically in the above-mentioned rear frame part 8B. And the suspension 36 comprises a guide pipe 22 extending in the z-axis direction perpendicular to the first and second shaft centers 3i and 18i, a slide shaft 23 inserted slidably in a central hole of the guide pipe 22, a retaining shaft holder 24 attached to an apex (in the present embodiment, an upper end) of this slide shaft 23, and a suspension spring 25 biasing this retaining shaft holder 24 in the z-axis direction and in a direction directing away from the above-mentioned first shaft center 3i.

Incidentally, the suspension spring 25 in the present embodiment comprises an inner suspension spring 25i outserted on the slide shaft 23 and having a low spring constant between the guide pipe 22 and the retaining shaft holder 24, and an outer suspension spring 25o outserted on the guide pipe 22 and having a high spring constant between the rear frame part 8B and the retaining shaft holder 24.

The retaining shaft holder 24 comprises fixing pieces 24a facing each other so as to be in a U-shaped fashion, and the above-mentioned holding shaft 18 is fixed between the fixing pieces 24a.

The above-mentioned cord-like body 20 comprises a one-side cord-like part 20L connecting the above-mentioned one-side first and second circular surface parts 21L and 26L, and another-side cord-like part 20R connecting the above-mentioned other-side first and second circular surface parts 21R and 26R.

Figure 6:
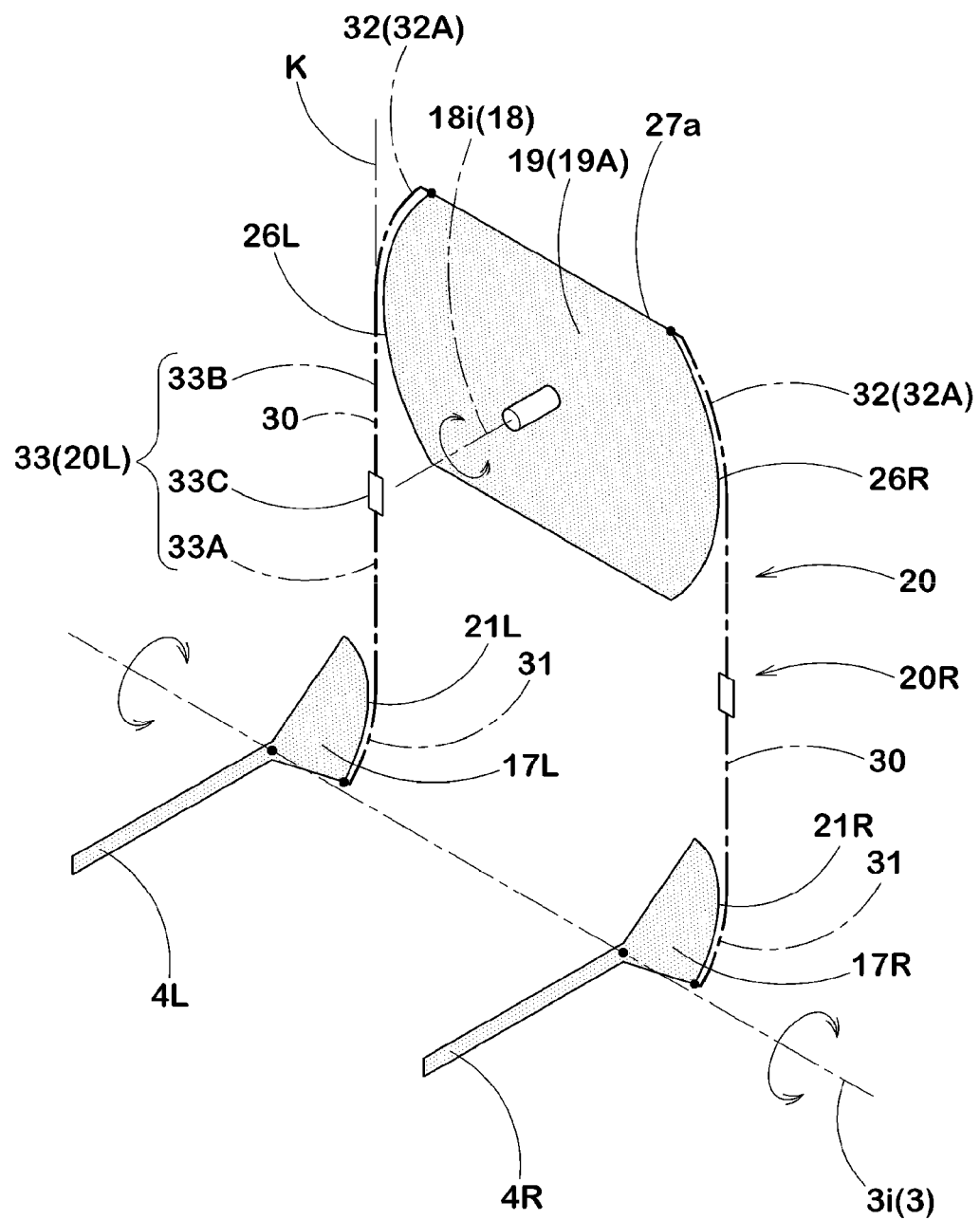
[FIG. 6] A view showing conceptually the interlocking device.

Of this, the one-side cord-like part 20L, as shown conceptually in FIG. 6, comprises a joint part 30 extending in the z-axis direction and extending along a tangential line K of the first circular surface part 21L and the second circular surface part 26L, a winding part 31 connecting to this joint part 30 and terminating by unwindably winding around the first circular surface part 21L, and a twining part 32 connecting to the joint part 30 and twining along the second circular surface part 26L.

In the present embodiment, the twining part 32 is formed as a second winding part 32A that terminates by unwindably winding around the second circular surface part 26L.

Similarly, the other-side cord-like part 20R comprises
a joint part 30 extending in the z-axis direction and extending along a tangential line of the first circular surface part 21R and the second circular surface part 26R,
a winding part 31 connecting to this joint part 30 and terminating by unwindably winding around the first circular surface part 21R,
a twining part 32 connecting to the joint part 30 and twining along the second circular surface part 26R.

In the present embodiment, the twining part 32 is formed as a second winding part 32A that terminates by unwindably winding around the second circular surface part 26R.

Meanwhile, it is important that the above-mentioned cord-like body 20 excels in durability, tension strength, and bend part performance. For this, the present embodiment adopts a roller chain 33 for a cord-like body 20. This roller chain 33 comprises
a first bend part 33A being flexible in the direction along the above-mentioned first circular surface part 21, and
a second bend part 33B being flexible in the direction along the above-mentioned second circular surface part 26; and connects the first and second bend parts 33A and 33B with a joint link 33C.

Figure 7:
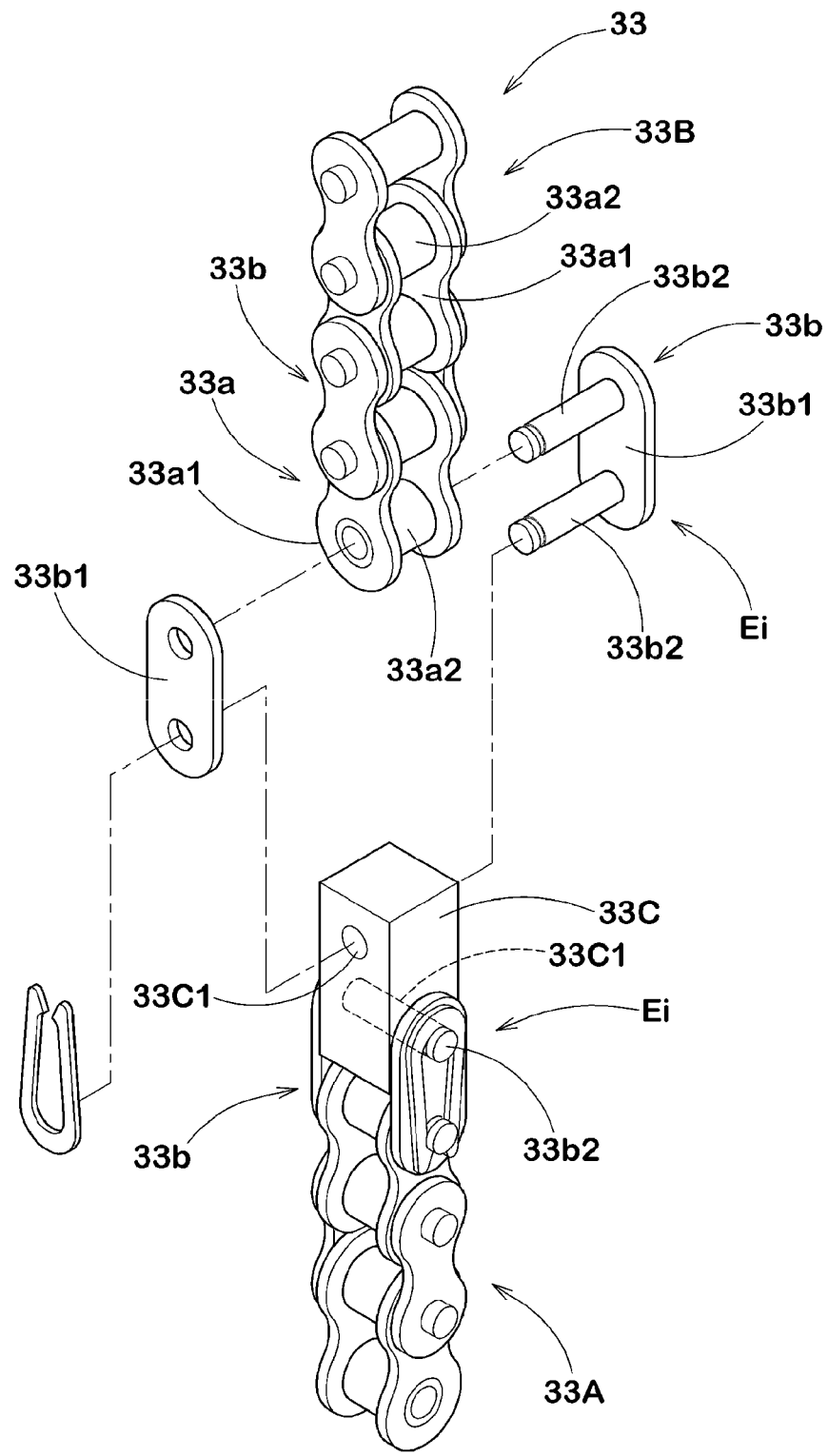
[FIG. 7] A perspective view explaining a connecting state between a first bend part and a second bend part.

More particularly, as shown in FIG. 7, the first and second bend parts 33A and 33B have a well-known structure, in which an inner link 33a and an outer link 33b are paired up alternately. The inner link 33a interfaces two inner plates 33a1 and 33a1 by pressing of two bushes 33a2. The outer link 33b interfaces two outer plates 33b1 and 33b1 by pressing of two pins 33b2. owing to the pin 33b2 inserted in the bush 33a2, the inner link 33a and the outer link 33b are flexibly and sequentially connected. Incidentally, not shown in FIG. 7, there is a roller 33D (shown in FIG. 9) rotatably outserted on an outside of the bush 33a2.

In the first and second bend parts 33A and 33B, each of inward-looking ends Ei facing each other terminates at an outer link 33b. In both end portions in the longitudinal direction of the above-mentioned joint link 33c, insertion holes 33C1 in which the pin 33b2 inserted are formed in turning 90 degrees different direction. Thus, the pin 33b2 of the inward-looking end of the above-mentioned first bend part 33A and the pin 33b2 of the inward-looking end Ei of the second bend part 33A respectively pass through the insertion holes 33C1 so that the first and second bend parts 33A and 33B are connected. Incidentally, for the joint link 33C, in the present embodiment, a rectangular-block-like joint link is used, but it may be made without limitation. various joint links such as column-shaped, oval-shaped and the like can be used.

Figure 8A:
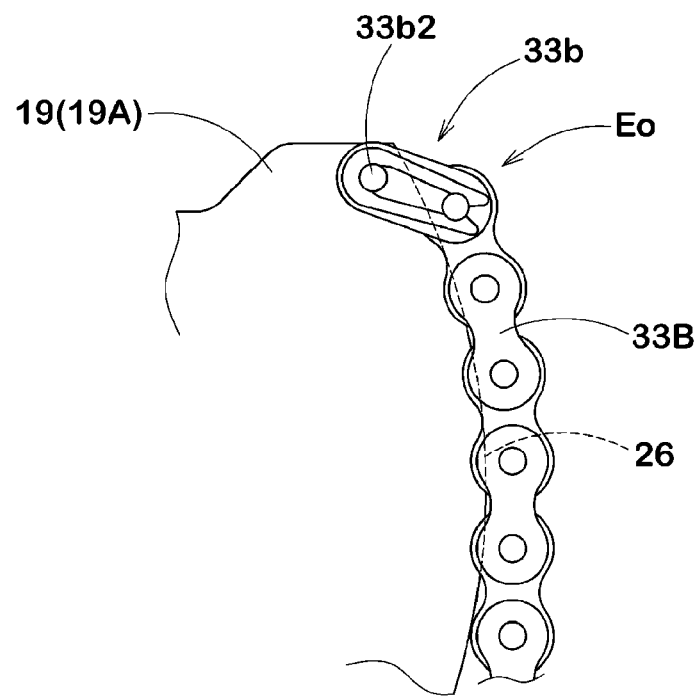
[FIGS. 8] (A) and (B) are front views explaining the connecting state between the first and second bend parts and first and second tilted members.
Figure 8B:
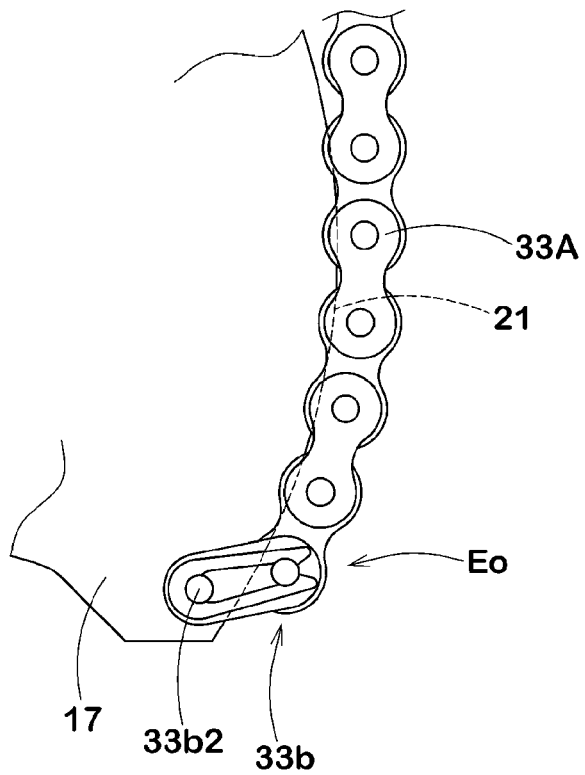

Similarly, as shown in FIGS. 8 (A) and (B), each of outward-looking ends Eo of the first and second bend parts 33A and 33B terminates at the outer link 33b, and the pin 33b2 of the outer link 33b of the outward-looking end is attached in penetrating the respective tilted member 17 and the change-direction member 19 in the thickness direction. This makes each of the outward-looking ends Eo be determined at the tilted member 17 and the change-direction member 19.

Figure 9:
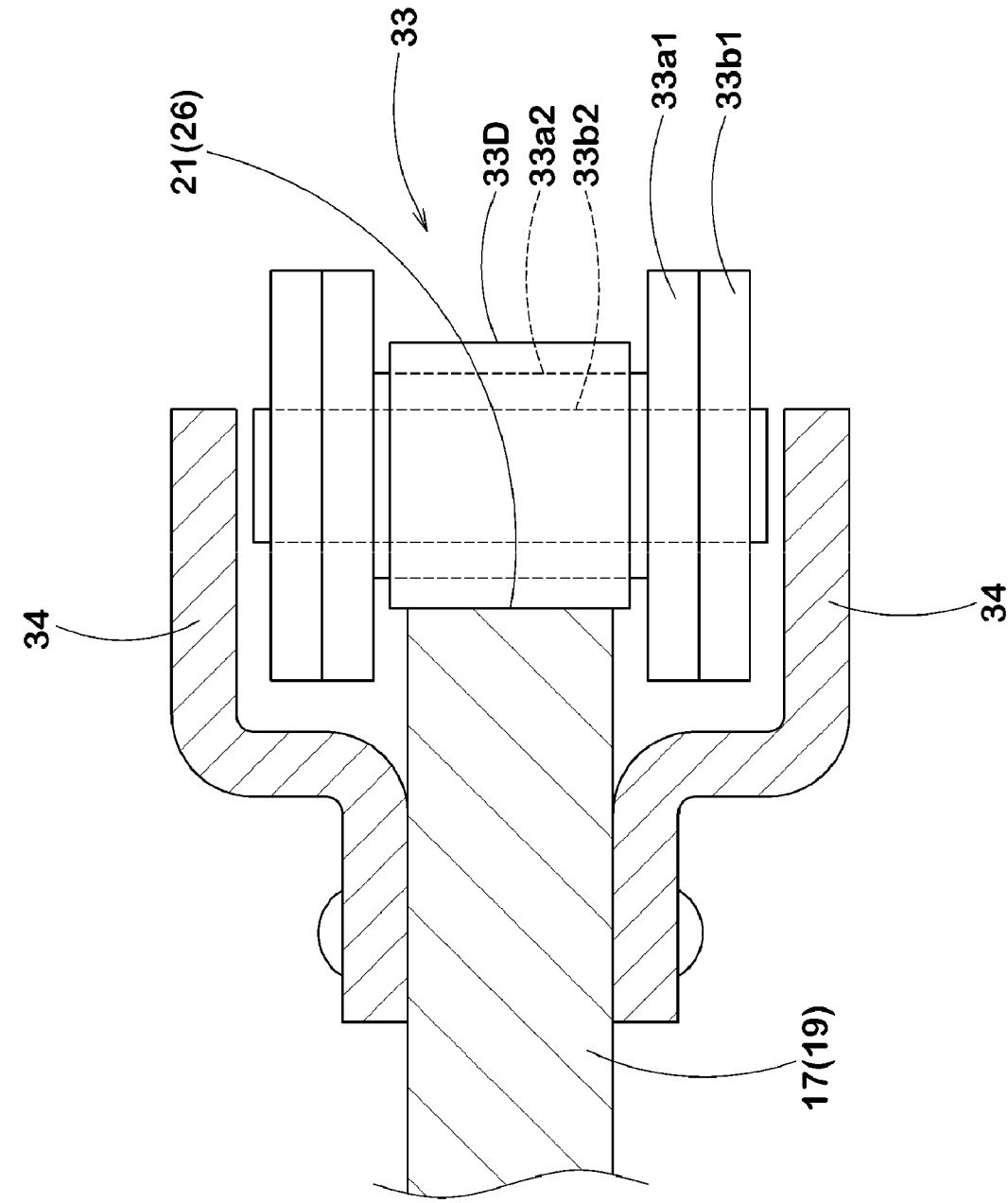
[FIG. 9] A front view explaining a shifting prevention plate.

Incidentally, in the present embodiment, the tilted member 17 and the change-direction member 19 are put between the inner plates 33a1 and 33a1 of the inner link 33a so that the roller chain 33 can be prevented from separating from the circular surfaces 21 and 26 while winding/unwinding. However, to ensure this separation-preventing, as shown in FIG. 9, it is also preferable to provide in both sides of the tilted member 17 and the change-direction member 19 with shifting prevention plates 34 in order to prevent the roller chain 33 from the shifting with respect to the thickness direction.

Incidentally, the above-mentioned first and second circular surface parts 21 and 26 can be provided with a sprocket-like groove that engages the roller chain 33. At this time, a pitch circle of the sprocket corresponds to each of the first and second circular surface parts 21 and 26. Incidentally, the roller chain 33 can be having various well-known structures. And, besides the roller chain 33, a v-belt, round belt, wire, rope and the like can be used for the above-mentioned cord-like body 20 as necessary.

Figure 10:
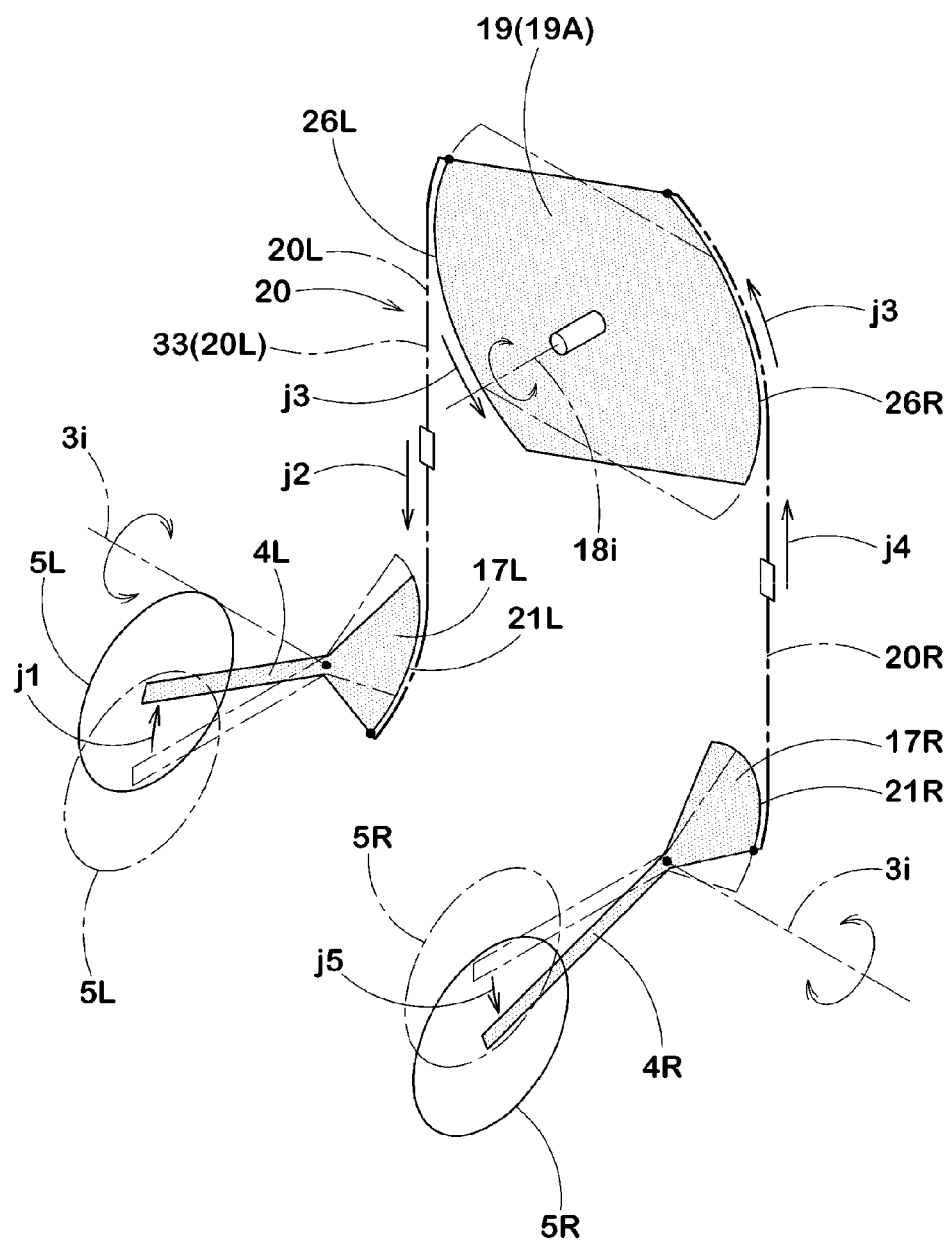
[FIG. 10] A view conceptually showing an action of the interlocking device.

Therefore, as showing conceptually in FIG. 10, when the one-side wheel 5L disposed on the rear wheel side is pushed up while running under pressure from a road surface, the one-side swinging arm 4L and the tilted member 17L tilt integrally around the first shaft center 3i (indicated by an arrow j1), and the one-side cord-like part 20L is pulled in the direction of winding around the first circular surface part 211 (indicated by an arrow j2). At this time, the change-direction member 19A of the present embodiment operates in a balance-like fashion, the one-side second circular surface part 26L thereof tilts in the direction of closing to the tilted member 17L (indicated by an arrow j3), and the other-side cord-like part 20R is pulled up in the direction rewinding around the second circular surface part 26R (indicated by an arrow j4). As a result, via the tilting of the other-side tilted member 17R and the swinging arm 4R (indicated by an arrow j5), the other-side wheel 5R can be pushed down toward the road surface.

Figure 11:
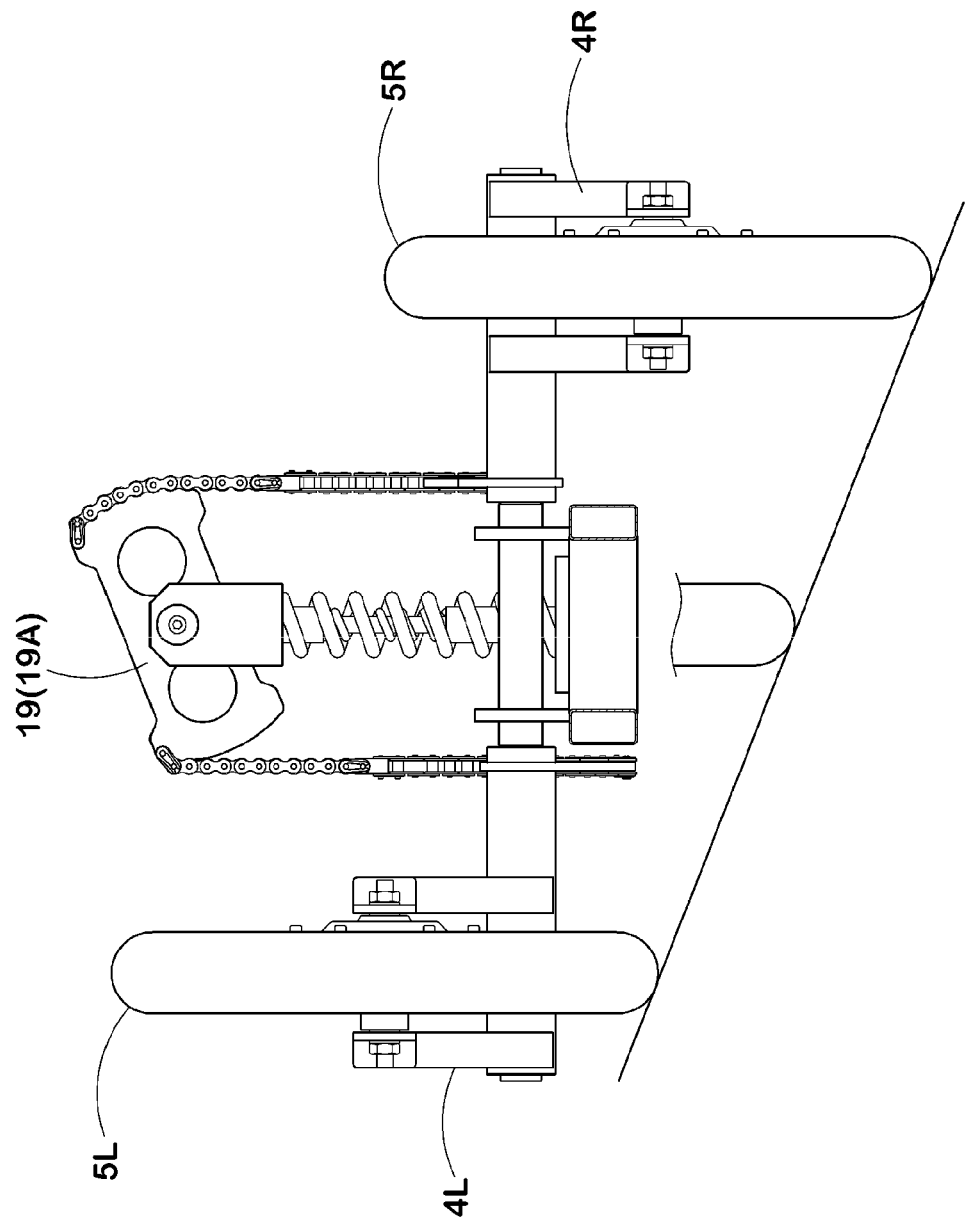
[FIG. 11] A back view explaining a state of the vehicle in running on a widthwise sloping road surface.

Consequently, the interlocking device 6 can press down the other-side wheel 5R with an equal force in response to the pushing up of the one-side wheel 5L. Therefore, at the time of circling and turning about with inclining a vehicle body and at the time of running on a widthwise sloping road surface as shown in FIG. 11, it enables to incline freely the two wheels 5L and 5R together with the vehicle body while keeping a ground-contacting-pressure of the two wheels 5L and 5R equal, and it enables to improve the camber thrust, cornering property, and steering stability.

Putting in perspective of the suspension 36, when both of the right and left wheels 5L and 5R get over an obstacle on a road during running, the forces F and F acting on the respective wheels 5L and 5R are borne by a reaction force 2F of the suspension spring 25, and raise the vehicle body or absorb impact. In contrast, when only the one-side wheel 5L gets over the obstacle, the other-side wheel 5R is pushed down owing to the above-mentioned interlocking device 6, for example; therefore, a spring length after loading of the suspension spring 25 becomes half-length of the spring length after loading on the above-mentioned case. Therefore, when only the one-side wheel 5L gets over the obstacle, only the repulsion of the reaction force F acts. Namely, in the present embodiment therefore, the single suspension can fulfill an equivalent function to a case of providing in the respective swinging arms with suspensions for reaction force F.

When the vehicle body is raised up, the swinging arms 4L and 4R tilt in the direction that the side of the rear end portion 4b (other-side end portion 4b) comes down owing to the own weight of the wheels 5L and 5R. At this time, the cord-like parts 20L and 20R may slack and stray from the first and second circular surface parts 21 and 26. However, in the present embodiment, extension of the suspension spring 25 can push up the change-direction member 19, and the tension is always loaded on the cord-like parts 20L and 20R so as to prevent the separation. Therefore, this requires a strong spring force when given the spring length after loading and a weak spring force when given the spring length before loading. In the present embodiment, the suspension spring 25 is therefore formed of two suspension springs: an inner suspension spring 25i having a low spring constant and an outer suspension spring 25o having a high spring constant as described above. Incidentally, in place of the above-mentioned two springs, the suspension spring 25 can be formed of a single spring having an irregular pitch.

Figure 12:
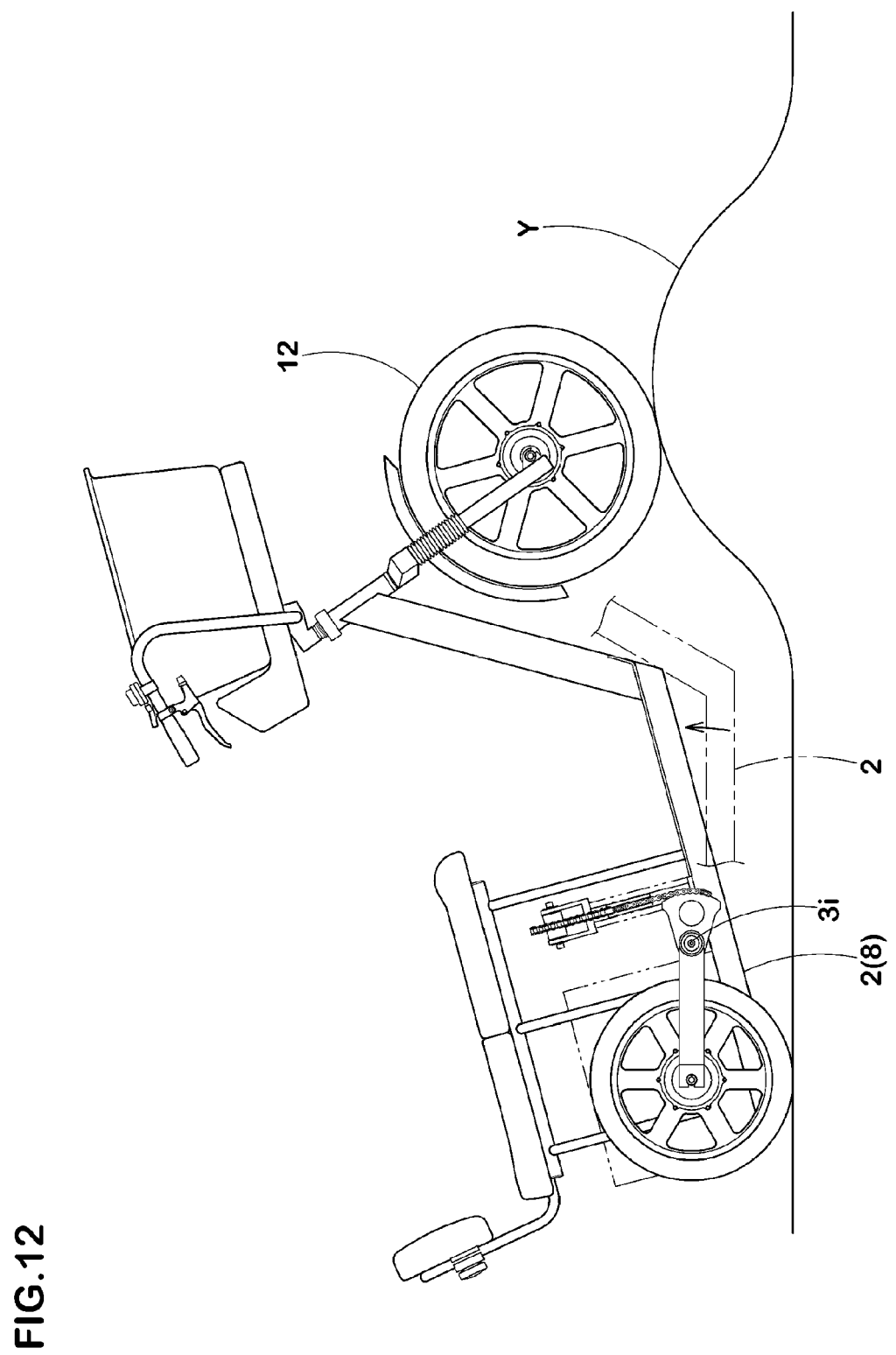
[FIG. 12] A side view explaining a state of the vehicle of which front wheel runs upon an obstacle.

In the above-mentioned multiple wheel vehicle 1, the swinging arms 4L and 4R interlock together with the interlocking device 6, but the swinging arms 4L and 4R turn freely with respect to the frame 2. Therefore, as shown in FIG. 12, when the front wheel 12 abruptly runs upon an obstacle Y and the like, for example, depending on a magnitude of a spring constant of the above-mentioned suspension spring 25, the frame 2 can be inclined around the shaft center (the first shaft center 3i) of the support shaft 3 by loading the suspension spring 25 so as to make the running smooth. And, in the present embodiment, the frame body 8 is disposed under the first shaft center 3i. In other words, the frame body 8 is kept hanging from the first shaft center 3i; therefore, a retention of the frame 2 can be stabilized.

Figure 13A:
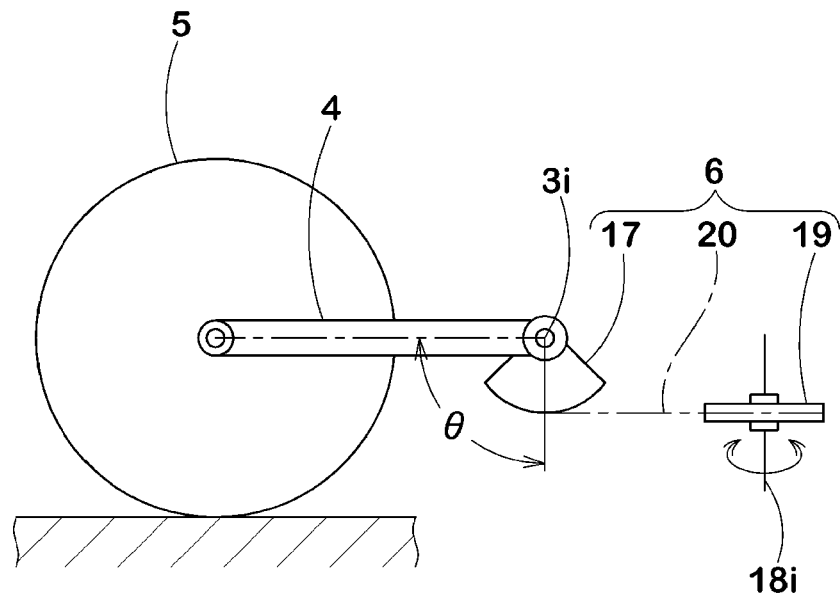
[FIGS. 13] (A) and (B) are views showing another example of attaching point of the interlocking device.
Figure 13B:
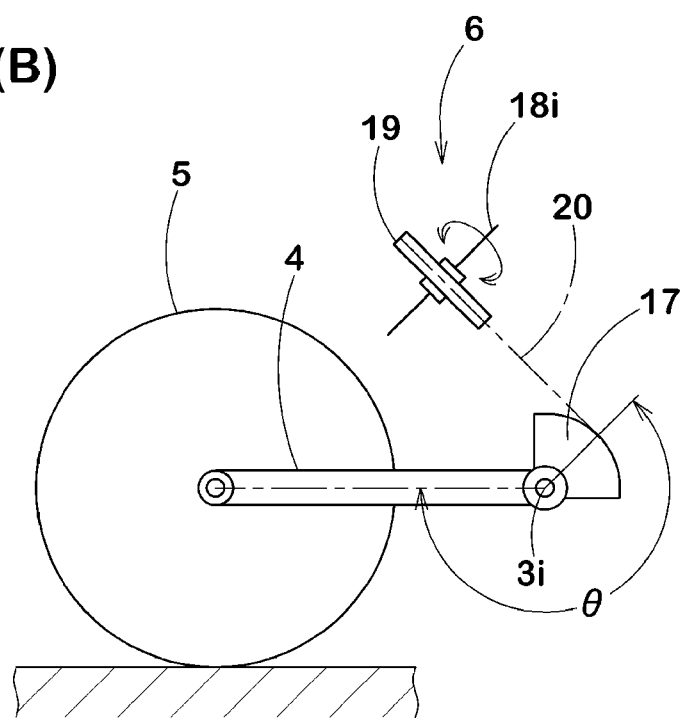

The above-mentioned interlocking device 6, as shown conceptually in FIGS. 13 (A) and (B), a phase angle theta (θ) of the tilted member 17 with respect to the swinging arm 4, that is to say, an attaching position of the interlocking device 6 can be freely defined, so that a designing possibility of the multiple wheel vehicle 1 can be enhanced.

And, in the interlocking device 6, as shown in FIGS. 14 (A) to (C), the above-mentioned change-direction member 19 can be performed in a pulley-like fashion in place of in a balance-like fashion.

When the change-direction member 19 performs in pulley-like fashion, at least for the cord-like body 20, a single cord-like body made of the one-side and other-side twining parts 32 and 32 connected via an extended part 40 or connected together directly, for example, is used. When the above-mentioned change-direction member 19 is oblong-plate-like (shown in FIG. 14 (A)) or semicircle-like (shown in FIG. 14 (C)), the change-direction member 19 is fixed disably tilting. When the change-direction member 19 is a circular-like (shown in FIG. 14 (B)) and when a lower half of the circular-like fashion thereof is removed and the like, the change-direction member 19 can be disably-tilted and can be pivotally supported around the second axis 18i tiltably.

Thus, the single cord-like body 20 is tuned up around the change-direction member 19 in u-shaped fashion. This changes a downward tension of the one-side cord-like part 20L (indicated by arrow j2) into an upward tension of the other-side cord-like part 20R (indicated by arrow j4) and makes tilting motions of the one-side and other-side swinging arms 4L and 4R to interlock up-and-down alternately.

Figure 15A:
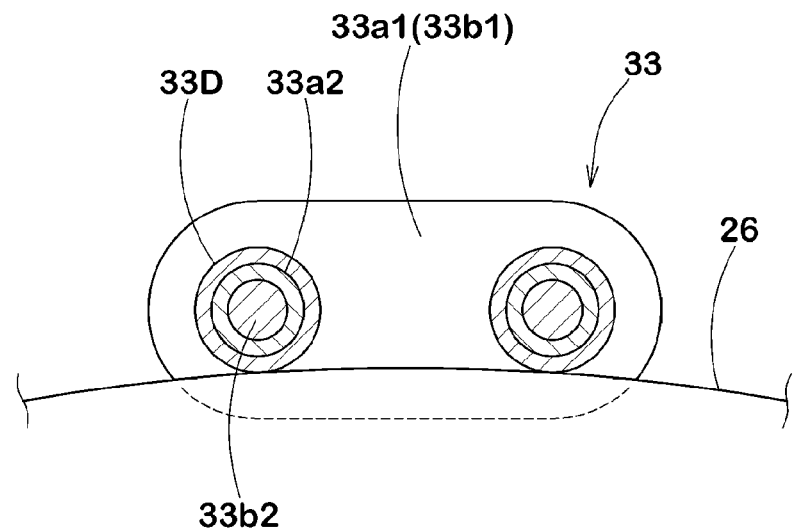
[FIG. 15] (A) is a cross-sectional view showing an example of a roller chain, and (B) is a cross-sectional view showing an example of the separation preventing.
Figure 15B:
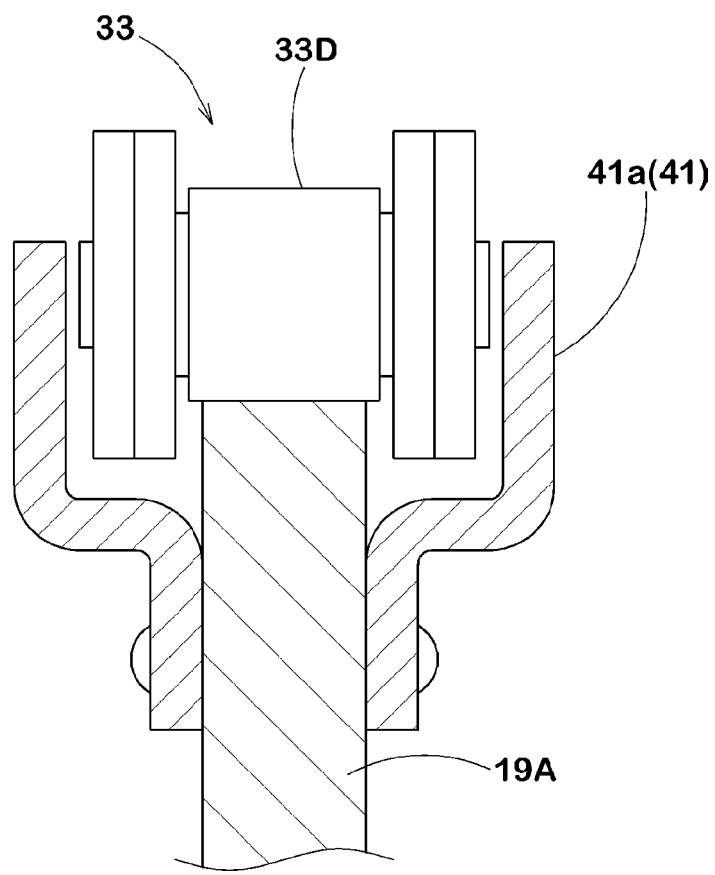
Figure 16A:
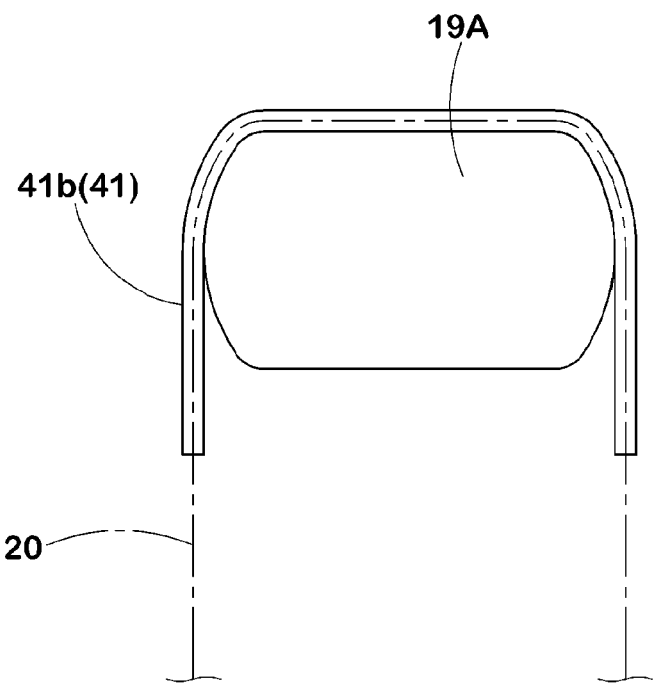
[FIG. 16] (A) and (B) are front views of another example of the separation preventing measure.
Figure 16B:
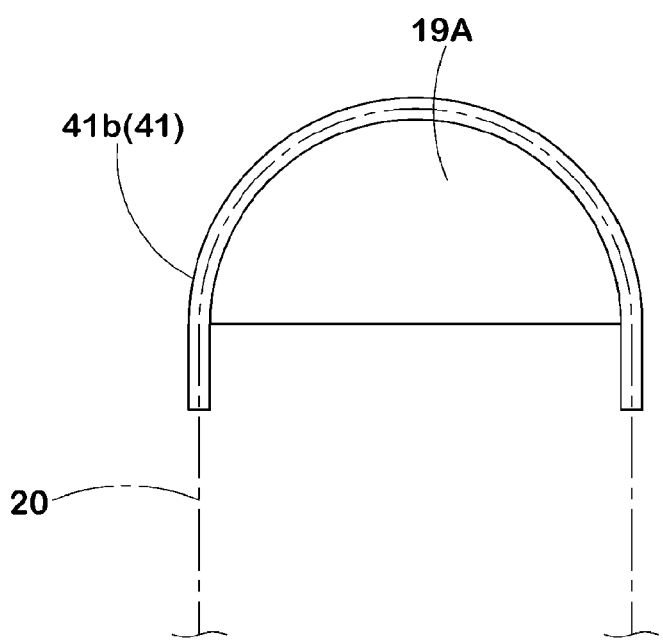

When the change-direction member 19 is fixed disably tilting, the cord-like body 20 slides in the circumferential direction on the fixed second circular surface part 26. Therefore, it is necessary that the second circular surface part 26 is formed of a smooth surface without unevenness such as a dent groove and the like in the circumferential direction. Incidentally, in the roller chain 33 as shown in FIG. 15 (A), the roller 33D is disposed rotatably outside each bush 33a2, so that the roller chain 33 can smoothly roll on the circular surface 26. Therefore, it is preferably adopted for the cord-like body 20. In the above-mentioned interlocking device 6, it is necessary that the cord-like body 20 does not separate from the second circular surface part 26. Therefore, it is preferable to provide in the change-direction member 19 with a separation preventing plate 41a (shown in FIG. 15 (B)) such as the above-mentioned shifting prevention plate 34 as a separation preventing measure 41. When the cord-like body 20 is a substantially round shape in cross-section such as a round belt, wire, rope, or the like, for example, it is preferable for the separation preventing measure 41 to adopt a guide tube 41a, which has a tube-like shape and outserts the cord-like body 20 so as to guide smoothly in the circumferential direction, as shown in FIGS. 16 (A) and (B), for example. This guide tube 41b is fixed integrally on the second circular surface part 26, for example. Incidentally, by making the guide tube 41b to have rigidity so as to prevent it from deformation, the guide tube 41b itself can be formed as a change-direction member 19.

When the circular-like (shown in FIG. 14 (B)) change-direction member 19 is pivotally supported tiltably, a sprocket provided with a toothed groove in the second circular surface part 26 and a toothed pulley can be used for the change-direction member 19, and a roller chain and a toothed belt which can engage the sprocket and the pulley can be used for the cord-like body 20.

Figure 17A:
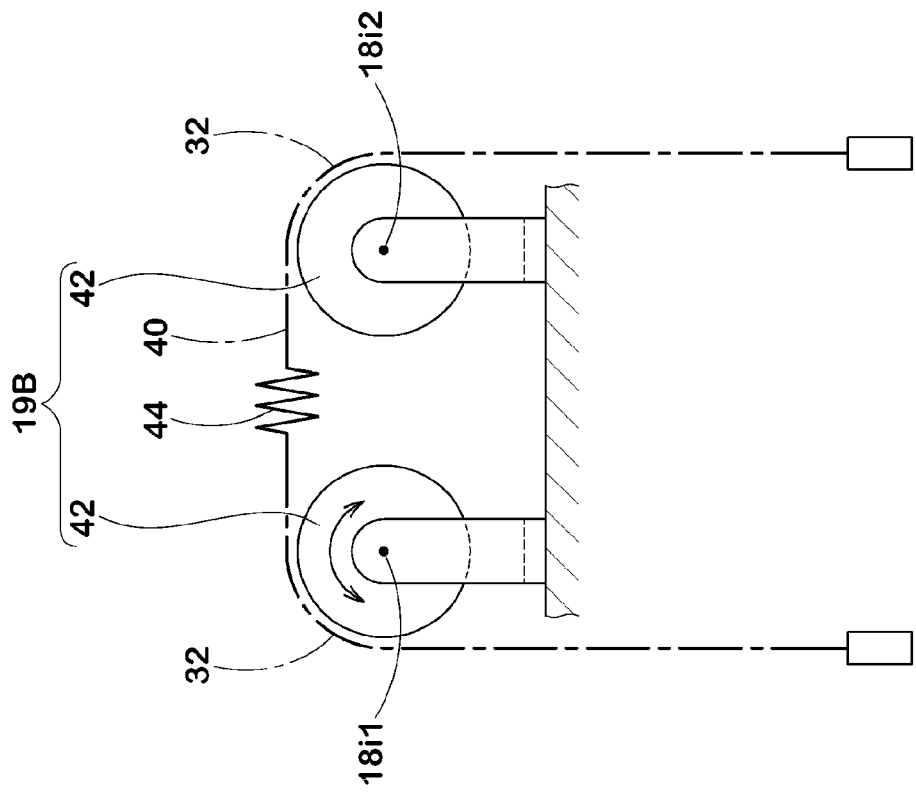
[FIG. 17] (A) and (B) are front views conceptually showing another example of the change-direction member operating in pulley-like fashion.
Figure 17B:
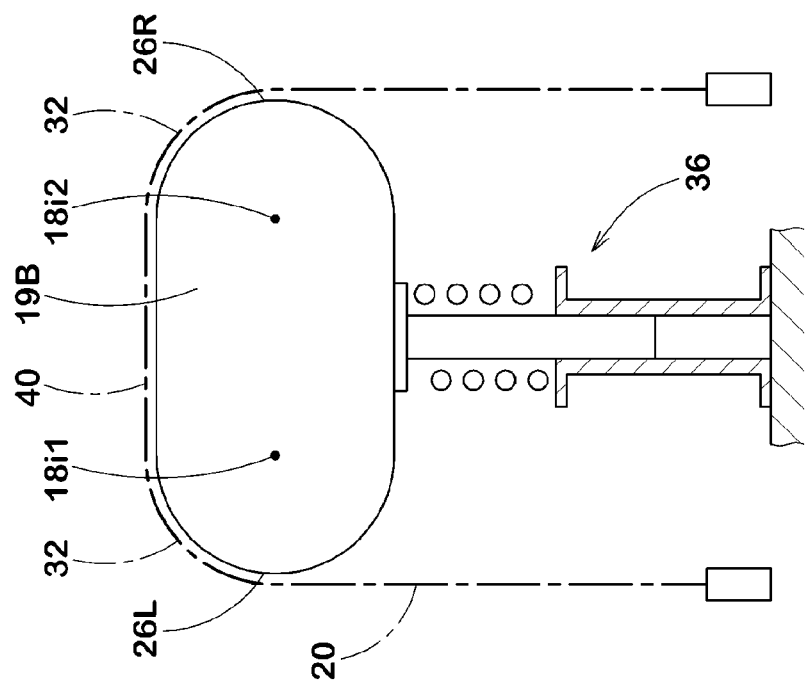

FIGS. 17 (A) and (B) show an embodiment that the change-direction member 19 is a change-direction member 19B comprising two center of circular arcs.

In FIG. 17 (A), the change-direction member 19B comprises two second shaft centers 18i1 and 18i2 located on the right and left sides thereof, and is formed of a single horizontally long oval-like body comprising the one-side second circular surface part 26L and the other-side second circular surface part 26R. The one-side second circular surface part 26L is defined as a circular surface part formed around one-side second shaft center 18i1 on the one side of the right and left sides of the center of circular arc. And, the other-side second circular surface part 26R is defined as a circular surface part formed around the other-side second shaft center 18i2 on the other side of the right and left sides of the center of circular arc. The oval-like change-direction member 19B is, similarly to that shown in FIGS. 14 (A) and (C), fixed disably tilting. And, for the cord-like body 20, a single cord-like body formed of the one-side and other-side twining parts 32 and 32 connected each other with an extension part 40, for example, is used.

In FIG. 17 (B), the change-direction member 19B comprises two second shaft centers 18i1 and 18i2 located on the right and left sides thereof, and is made of two, one-side and other-side, disk-like bodies 42 and 42 having the one-side and other-side second shaft centers 18i1 and 18i2 and defined as respective centers of the circular arc. The two disk-like bodies 42 and 42 can be pivotally supported tiltably and can be fixed disably-tilting around each of the second shaft centers 18i1 and 18i2. The single cord-like body formed of the one-side and other-side twining parts 32 and 32 connected each other with the extension part 40, for example, can be used for the above-mentioned cord-like body 20. Incidentally, when each of the disk-like bodies 42 is pivotally supported, the sprocket, toothed pulley and the like can be adopted for the disk-like body 42. And, the roller chain and the toothed belt that can engage the sprocket and the pulley and the like can be adopted for the cord-like body 20.

In the present embodiment, in place of the above-mentioned suspension 36, between the twining parts 32 and 32 of the cord-like body 20, there is a cushion spring 44. This is because, when the two disk-like bodies 42 are supported with a single suspension 36, the structure thereof becomes complex; therefore, the apparatus becomes larger, and costs increase. The cushion spring 44 can perform the same function as the above-mentioned suspension 36 with a simple structure.

Figure 18:
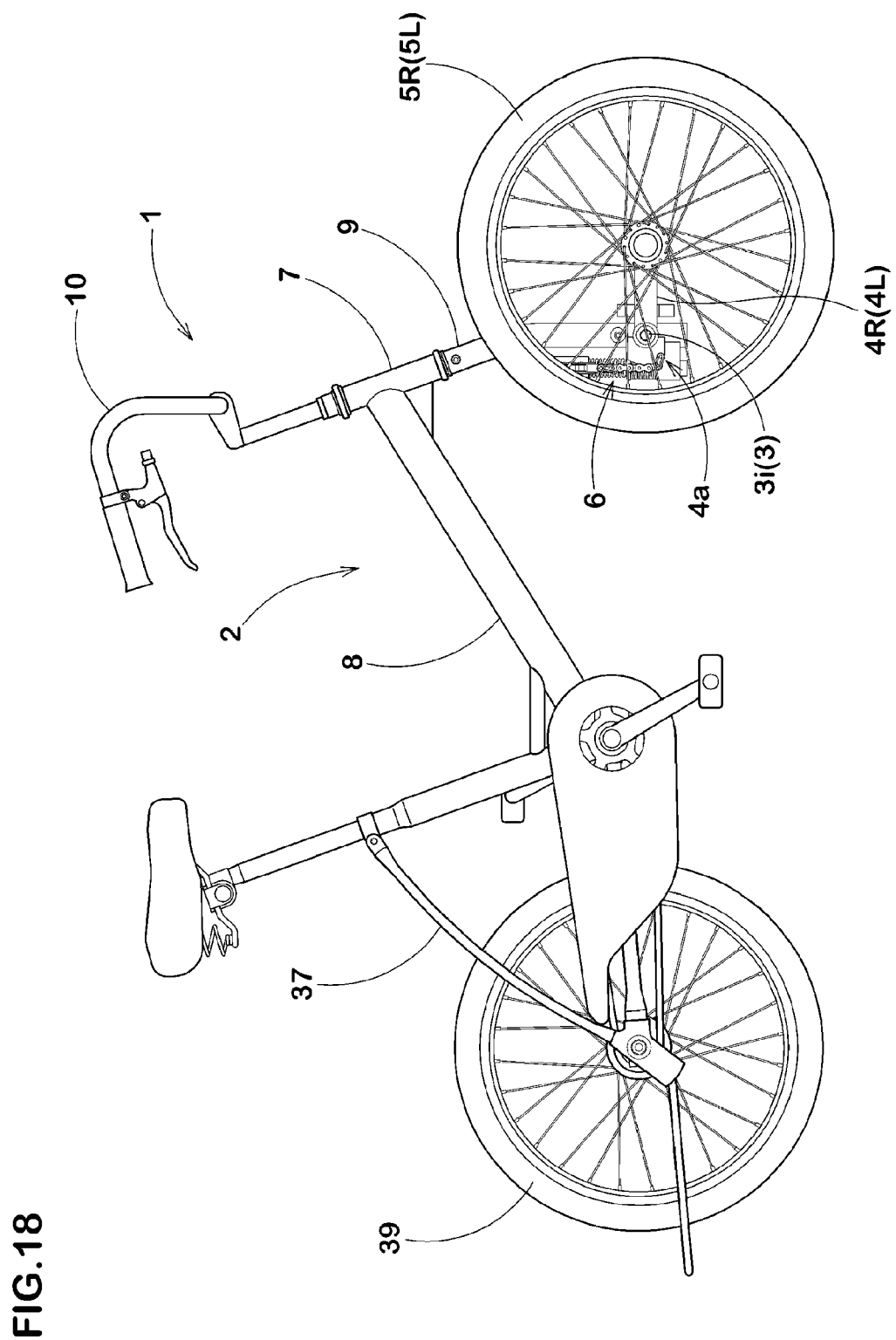
[FIG. 18] A side view of a multiple wheel vehicle showing another example of the present invention (an example of the vehicle comprising two wheels on a front wheel side).

FIGS. 18 to 22 show the multiple wheel vehicle 1 having a front two-wheel type and provided with two wheels on the front wheel side (so-called a second embodiment). The multiple wheel vehicle 1 according to this second embodiment is a bicycle in this example. As shown in FIG. 18, the frame 2 comprises a frame body 8 extending back and forth and comprising a head pipe 7 fixed at a front end, and a steering shaft 9 kept freely turning on the head pipe 7. on the rear end of the frame body 8, a single rear wheel 39 is rotatably mounted via a rear fork 37.

On the upper end of the above-mentioned steering shaft 9, a handlebar 10 is attached. The lower end of the steering shaft 9 is provided with
- a support shaft 3,
- a pair of swinging arms 4L and 4R of which a one-side end portion 4a (in the present embodiment, the rear end portion 4a) is pivotally supported in the support shaft 3,
- a pair of wheels 5L and 5R for front wheels attached to another-side end portion 4b (in the present embodiment, the front end portion 4b) of each of the swinging arms 4L and 4R, and
- an interlocking device 6 to interlock the tilting motion of the swinging arms 4L and 4R.

Figure 21:
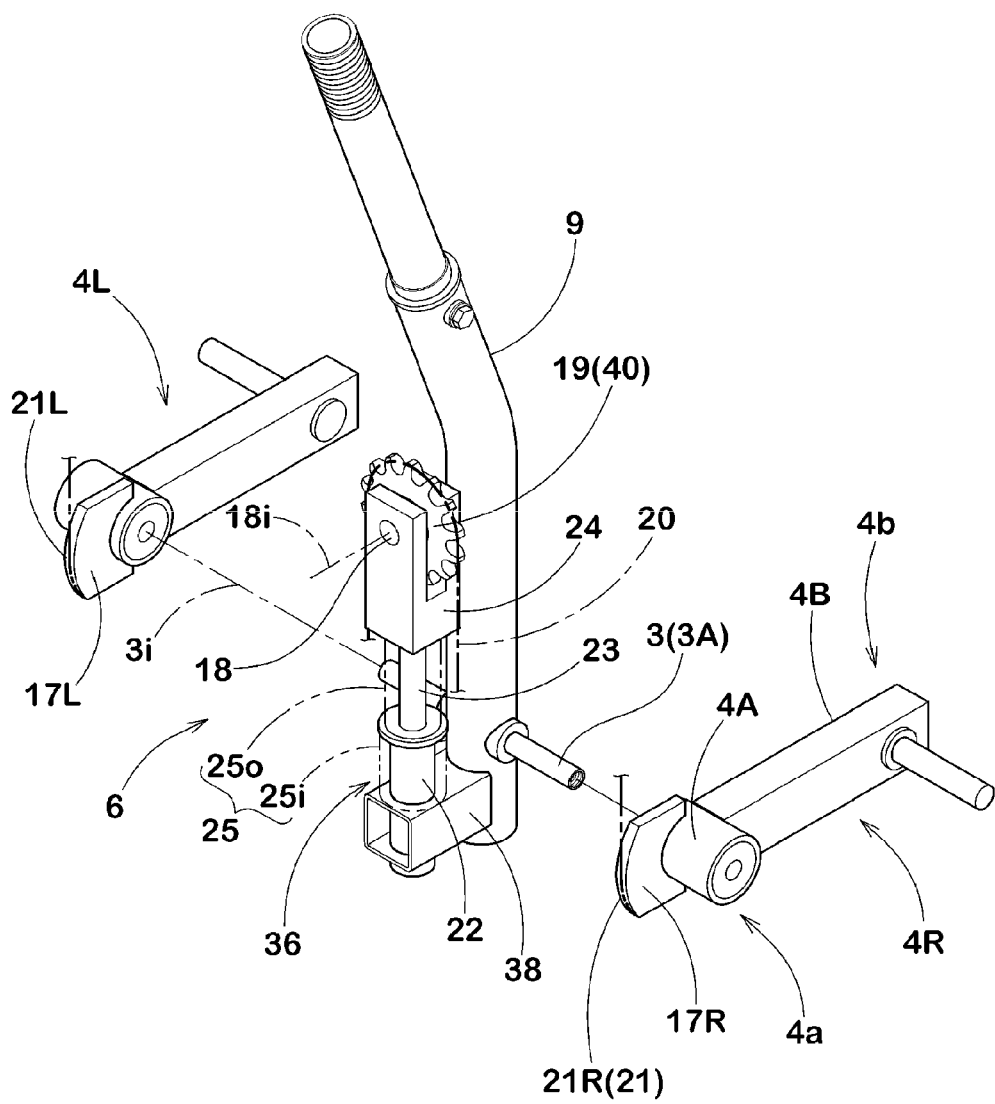
[FIG. 21] An enlarged perspective view of the swinging arm with the interlocking device.

As shown in FIG. 21, the support shaft 3 is a horizontal fixed axis fixed on the steering shaft 9 by welding and the like. The both edges thereof comprise support shaft portions 3A and 3A protruding right and left.

The above-mentioned swinging arms 4L and 4R comprise a pivot point 4A with a built-in shaft bearing member retained insertionally on the support shaft portion 3A, and a single arm portion 4B extending forward from this pivot point 4A. Thus, on a front-end portion of the arm portion 4B of each of the swinging arms 4L and 4R, there is a wheel 5L or 5R mounted in cantilever way in the present embodiment. This reduces a width between the wheels 5L and 5R to approximately 100 to 300 mm, for example, and a handling performance can be improved at the same level as a two-wheels vehicle.

Similarly to the above-mentioned first embodiment, the above-mentioned interlocking device 6 comprises
- tilted members 17L and 17R fixed on the above-mentioned swinging arms 4L and 4 respectively,
- a change-direction member 19 supported with the above-mentioned frame 2 (in the present embodiment, a steering shaft 9), and
- a cord-like body 20 interlocking between the one-side and other-side tilted members 17L and 17R via the change-direction member 19.

The present embodiment shows a case that the change-direction member 19 is pivotally supported with a holding shaft 18 held with the steering shaft 9.

The tilted members 17L and 17R comprise a first circular surface part 21 formed around a shaft center (a first shaft center 3i) of the above-mentioned support shaft 3, which is a center of the circular arc, and each of the tilted members is substantially fan-like in this embodiment and fixed on an inner end side of the above-mentioned pivot point 4A.

The above-mentioned holding shaft 18 comprises a second shaft center 18i, which is in the direction perpendicular to the above-mentioned first shaft centers 3i, and is supported via a suspension 36 attached to the above-mentioned steering shaft 9. In the steering shaft 9, a rectangular-block-like suspension mounting stage 38 protruding backward is formed integrally on a lower side of the above-mentioned support shaft 3 in the present embodiment. The above-mentioned suspension 36 comprises
- a guide pipe 22 placed vertically in the suspension mounting stage 38 in the Z-axis direction,
- a slide shaft 23 inserted slidably in a central hole of this guide pipe 22,
- a retaining shaft holder 24 attached to a tip of this slide shaft 23 (in the present embodiment, the upper end), and
- a suspension spring 25 biasing this retaining shaft holder 24 in the z-axis direction and the above-mentioned in the z-axis direction and in directing away from the above-mentioned first shaft center 3i.

Incidentally, the suspension spring 25 comprises
- an upper suspension spring 25o disposed on the upper side and having a high spring constant, and
- a lower suspension spring 25i disposed on the lower side and having a low spring constant.

Figure 20:
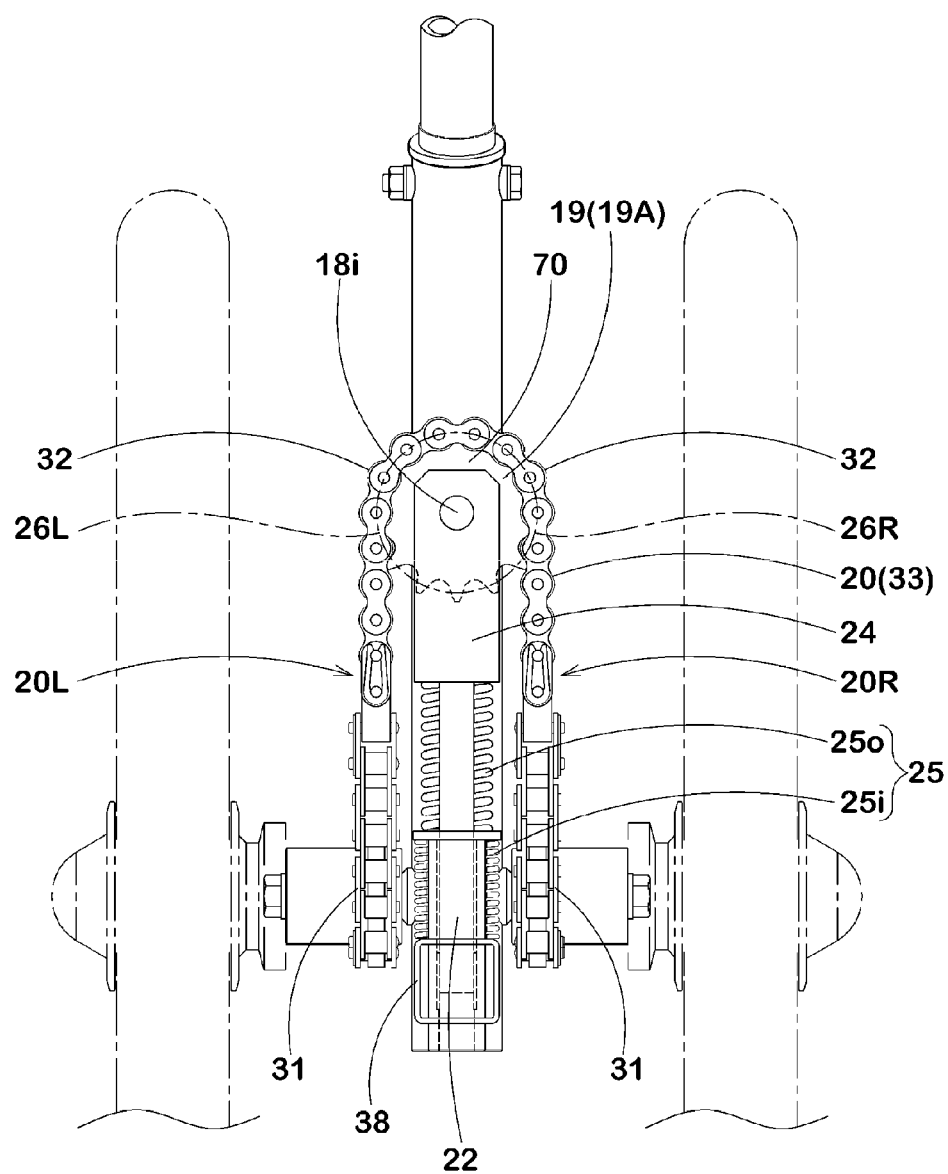
[FIG. 20] An enlarged back view of the swinging arm with the interlocking device.

The above-mentioned change-direction member 19 is a change-direction member 19A having a single circular arc in the present embodiment. As shown in FIG. 20, for the change-direction member 19, a circular-like fashion can be adopted, in which the second circular surface parts 26L and 26R formed around the second shaft center 18i on both right and left sides thereof and connected each other with the same circular arc. Especially in the present embodiment, a sprocket 70 for roller chain with toothed grooves on an outer circumferential surface made of the second circular surface parts 26L and 26R is used as a change-direction member 19. In this case, a pitch circle of the sprocket 70 forms the second circular surface parts 26L and 26R.

Figure 19:
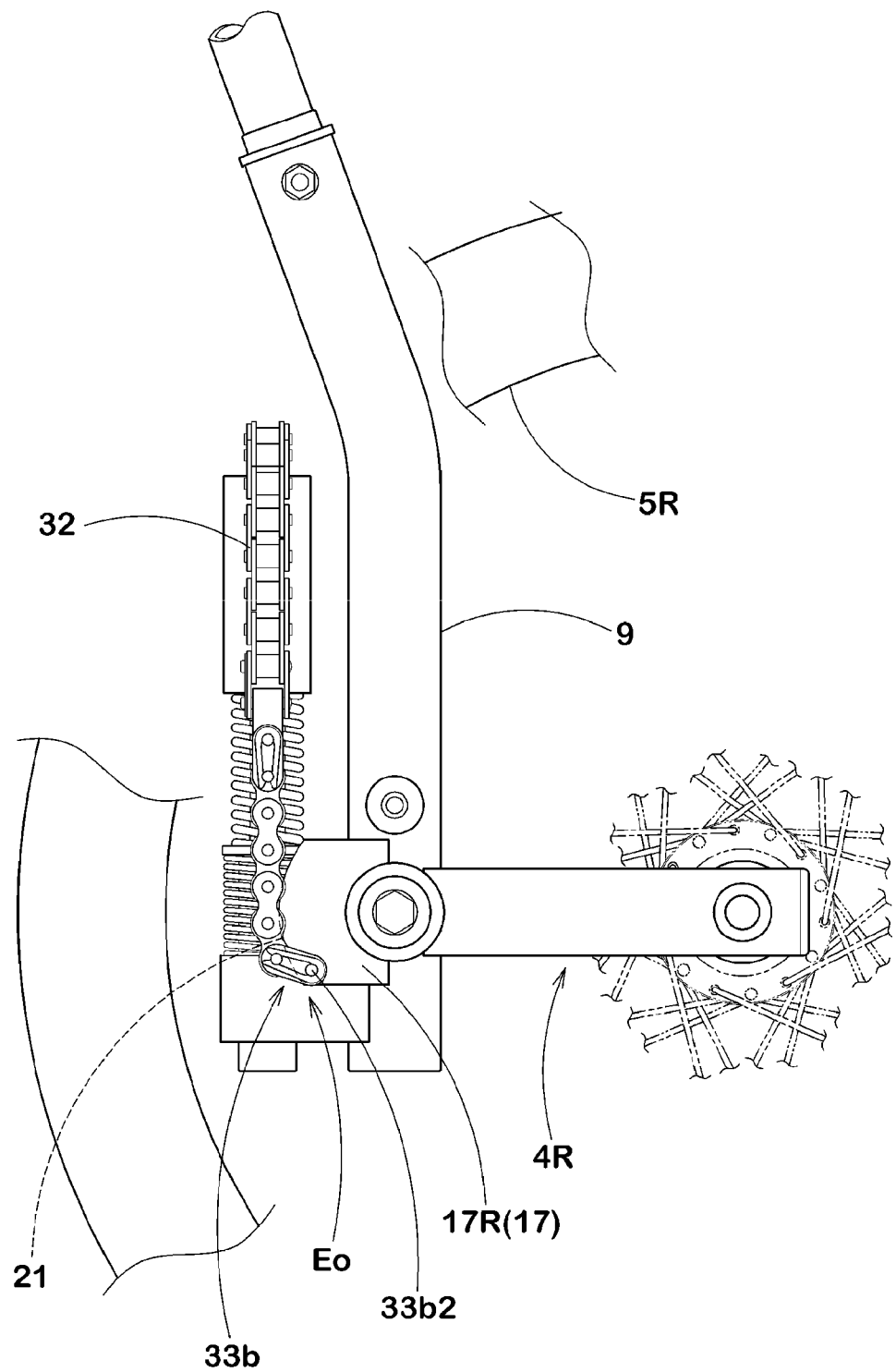
[FIG. 19] An enlarged side view of the swinging arm with the interlocking device.

The cord-like body 20 is, in the present embodiment, made of a single roller chain 33 engaging with the above-mentioned sprocket 70. And, one-side cord-like part 20R connecting the above-mentioned one-side first and second circular surface parts 21L and 26L, and the other-side cord-like part 20R connecting the above-mentioned other-side first and second circular surface parts 21R and 26R are continuously formed. Therefore, the cord-like body 20 according to the present embodiment, the twining parts 32 and 32 are wound each other continuously around the sprocket 70 in a U-shape and engaging with the sprocket 70, so that the twining part 32 is terminated by winding unwindably around the second circular surface part 26. Incidentally, as shown in FIG. 19, since the winding part 31 winding unwindably around the first circular surface part is determined on the tilted member 17, a pin 33b2 of an outer link 33b of an out-looking end Eo (in the present embodiment, a lower end Eo) is attached in penetrating each tilted member 17 in the thickness direction.

Figure 22:
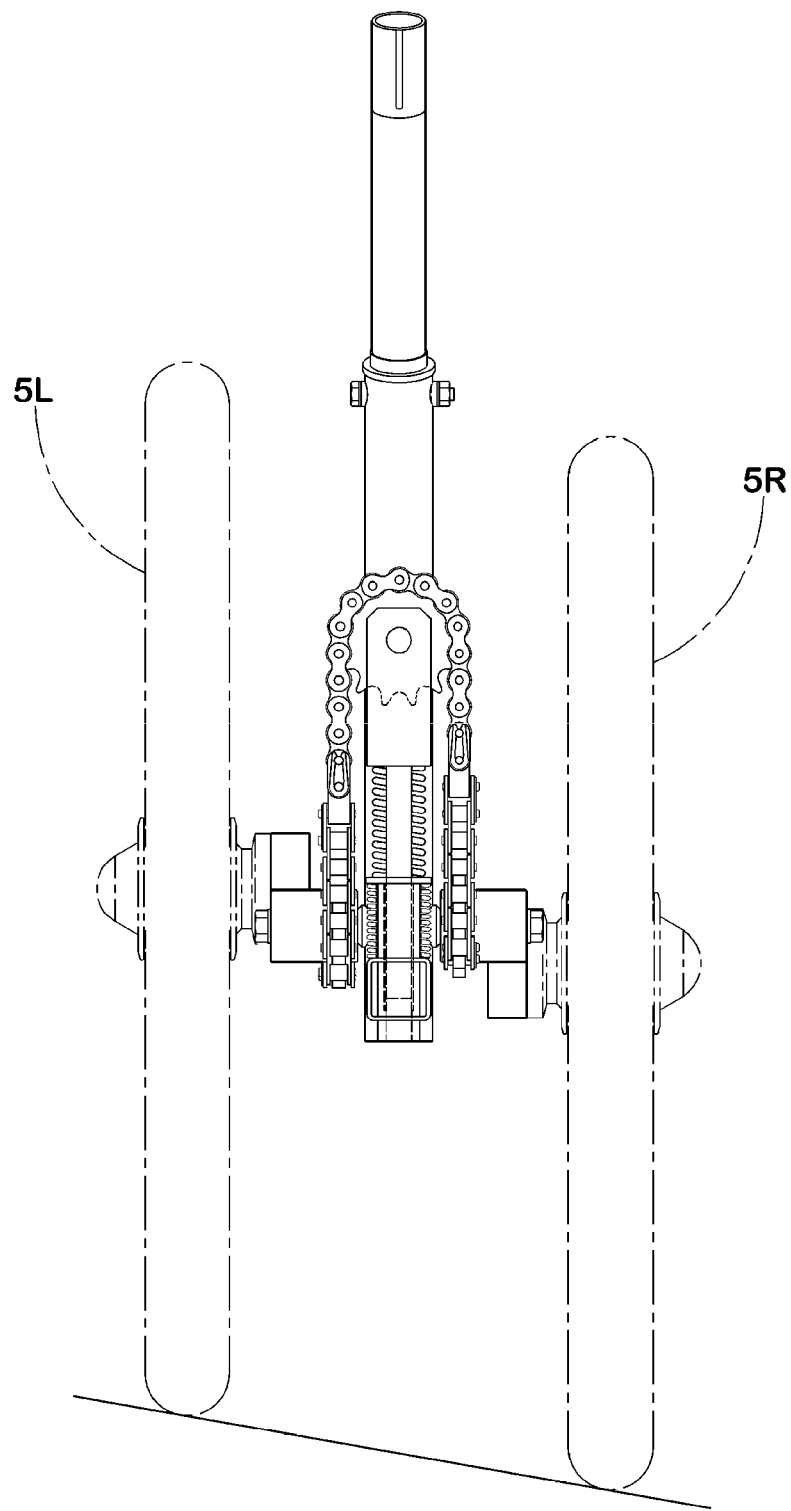
[FIG. 22] A back view explaining a state of the vehicle in running on a widthwise sloping road surface.

Similarly to the above-mentioned first embodiment of the rear two-wheel typed multiple wheel vehicle 1, the second embodiment of the front two-wheel typed multiple wheel vehicle 1 can also press down the other-side wheel 5R with an equal force in response to the pushing up of the one-side wheel 5L. Therefore, at the time of circling and turning about with inclining a vehicle body and at the time of running on a widthwise sloping road surface and the like, as shown in FIG. 22, it enables to incline freely the two wheels 5L and 5R together with the vehicle body while keeping ground-contacting-pressures of the two wheels 5L and 5R equal, and to improve the cornering property and steering stability.

Figure 23:
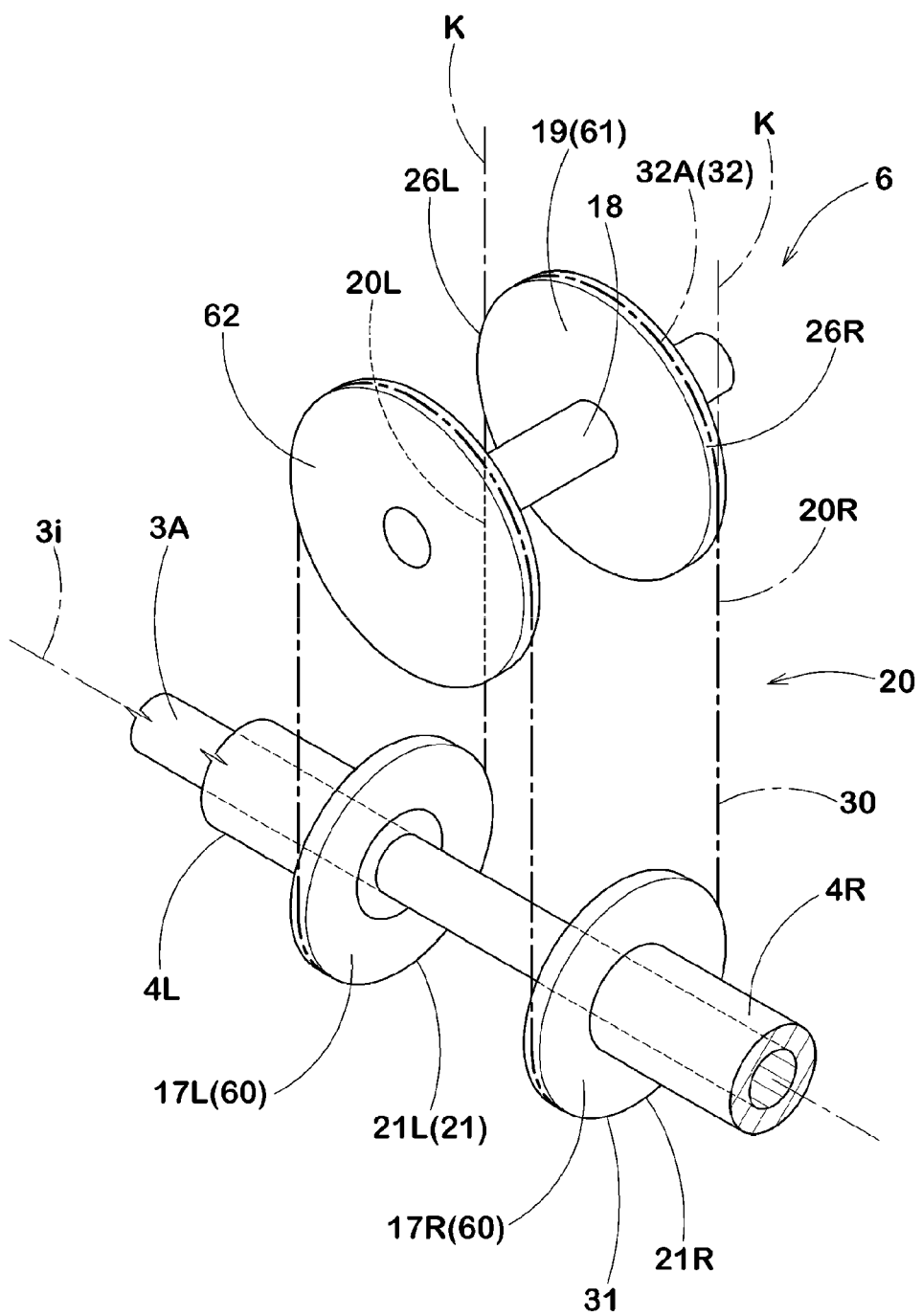
[FIG. 23] A perspective view showing another example of the interlocking device.
Figure 24:
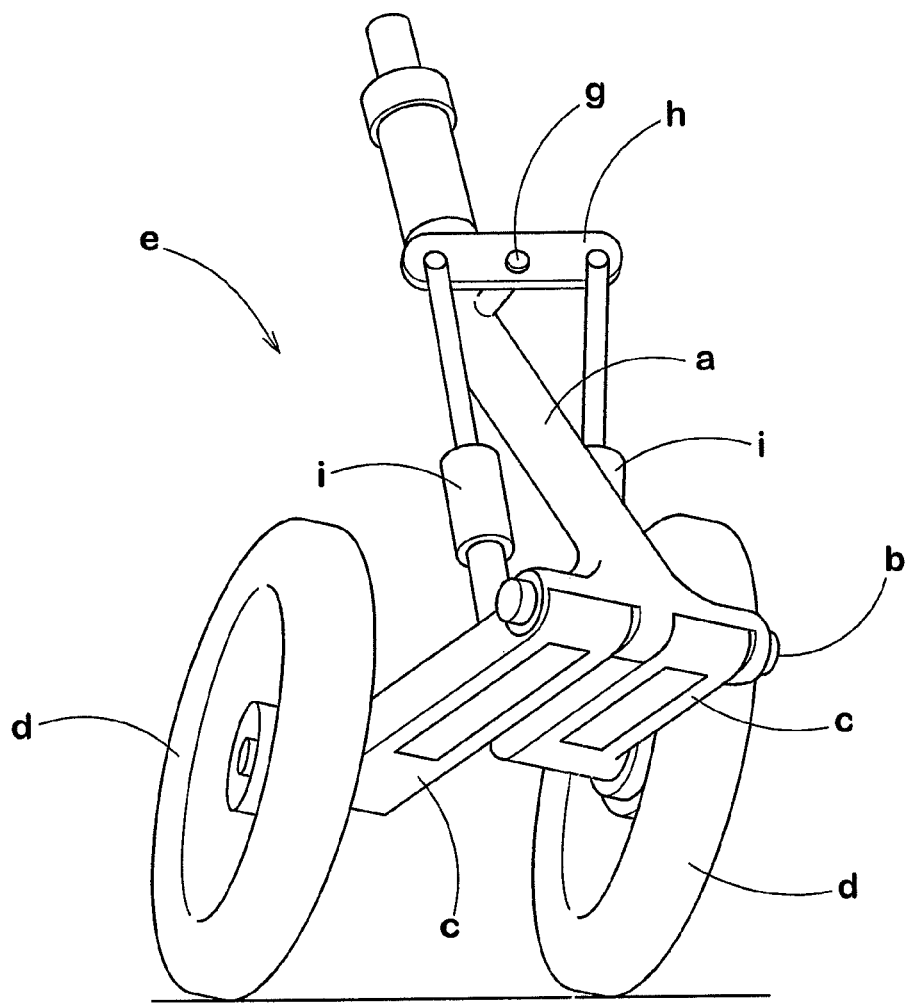
[FIG. 24] A perspective view showing a main part of a multiple wheel vehicle according to a conventional art.

[FIG. 23] shows yet another example of the interlocking device 6. In the present embodiment, each of the tilted members 17L and 17R is a disk-like shape having a central angle alpha (α) of the first circular surface parts 21 of 360 degrees. More particularly, the tilted members 17L and 17R are pulleys 60 for a v-belt or for a toothed belt, for example, and fixed freely rolling on the respective swinging arms 4L and 4R integrally. And, the change-direction member 19 is also formed of a disk-like body of a pulley 61 and is pivotally supported with a holding shaft 18 perpendicular to the first shaft center 3i. on the holding shaft 18, an auxiliary pulley 62 having the substantially same diameter as that of a change-direction member 19 is pivotally supported with the substantially same intervals as the diameter of the pulley 60.

The cord-like body 20 is an endless connecting V-belt or toothed belt adopted for the respective pulleys 60 to 62. As shown in FIG. 23, the cord-like body 20 is wound in the following order:

"the one-side pulley 60 (the tilted member 17L)";
"the pulley 61 (the change-direction member 19)";
"the other-side pulley 60 (the tilted member 17R)";
"the auxiliary pulley 62"; and
"the one-side pulley 60 (the tilted member 17L)".

Incidentally, in place of the above-mentioned v-belt and toothed belt, the above-mentioned roller chain 33 can be adopted. At this time, in place of the pulleys 60 to 62, the sprocket is adopted.

In this case, the above-mentioned cord-like body 20 comprises the one-side cord-like part 20L connecting the above-mentioned one-side first and second circular surface parts 21L and 26L, and the other-side cord-like part 20R connecting the above-mentioned other-side first and second circular surface parts 21R and 26R.

Each of the cord-like parts 20L and 20R comprises a joint part 30 extending in the Z-axis direction along the tangential line K bordering upon the first circular surface part 21L (or 21R) and the second circular surface part 26L (or 26R), a winding part 31 connecting with the joint part 30 and terminated by winding unwindably around the first circular surface part 21L (or 21R), and a twining part 32 as the winding part 32A connecting with the joint part 30 and terminating by winding unwindably around the second circular surface part 26L (or 26R).

Hereinbefore, especially preferred embodiments of the present invention were described, but it will be obvious that various changes such as forming a four-wheeled vehicle comprising two-wheels on both of a front wheel side and a rear wheel side may be made without limitation to what was shown in the drawings. Incidentally, the multiple wheel vehicle includes, for example, a baby carriage, a walker for an aged person, a burden carrier, a transportation multiple wheel vehicle and the like.

The invention claimed is:

1. A multiple wheel vehicle with two wheels on a front wheel side and/or a rear wheel side, wherein the multiple wheel vehicle comprises one-side and other-side swinging arms, wherein each of the swinging arms comprises one end portion supported pivotally with each of right and left support shaft portions supported with a frame and extending on a same shaft center line and another end portion tilted up-and-down freely, a wheel mounted on the other end portion of each of the one-side and other-side swinging arms, and an interlocking device for interlocking the tilting motion of the one-side and other-side swinging arms alternately up-and-down; said interlocking device comprises a tilted member comprising a first circular surface part which has a center of a circular arc as a first shaft center which is the shaft center of said support shaft portion and fixed on the each swinging arm and enabling tilting around the first shaft center integrally with the swinging arm, a change-direction member having one-side and other-side second circular surface parts, each of which has a center of the circular arc as a second shaft center which is in a direction perpendicular to each of said first shaft centers, and a cord-like body comprising one-side cord-like part connecting the one-side first circular surface part and the other-side second circular surface part and another-side cord-like part connecting the first and second circular surface parts on the other-side; each of the one-side and other-side cord-like parts comprises a joint part extending in a Z-axis direction perpendicular to said first and second shaft centers and extending along a tangential line of the first circular surface part and the second circular surface part, a winding part connecting to the joint part wound on the first circular surface part immovably in relation to the first circular surface part, a twining part connecting to the joint part and wound on the second circular surface part; and each of said twining part wound on each of said second circular surface parts immovably in relation to each of said second circular surface parts.

2. The multiple wheel vehicle as set forth in claim 1, characterized in that
said interlocking device comprises a suspension biasing said change-direction member in the Z-axis direction and in directing away from said first shaft center.

3. The multiple wheel vehicle as set forth in claim 1, characterized in that
said cord-like body is made of a roller chain.

4. The multiple wheel vehicle as set forth in claim 3, characterized in that said roller chain comprises
a first bend part which is flexible in the direction along said first circular surface part and
a second bend part which is flexible in the direction along said second circular surface part, and
the first and second bend parts are connected with a joint link.

5. A multiple wheel vehicle with two wheels on a front wheel side and/or a rear wheel side, wherein the multiple wheel vehicle comprises one-side and other-side swinging arms, wherein each of the swinging arms comprises one end portion supported pivotally with each of right and left support shaft portions supported with a frame and extending on a same shaft center line and another end portion tilted up-and-down freely, a wheel mounted on the other end portion of each of the one-side and other-side swinging arms, and an interlocking device for interlocking the tilting motion of the one-side and other-side swinging arms alternately up-and-down; said interlocking device comprises a tilted member comprising a first circular surface part which has a center of a circular arc as a first shaft center which is the shaft center of said support shaft portion and fixed on the each swinging arm and enabling tilting around the first shaft center integrally with the swinging arm, a change-direction member having one-side and other-side second circular surface parts, each of which has a center of the circular arc as a second shaft center which is in a direction perpendicular to each of said first shaft centers, and a cord-like body comprising one-side cord-like part connecting the one-side first circular surface part and the other-side second circular surface part and other-side cord-like part connecting the other-side first circular surface part and the other-side second circular surface part; each of the one-side and other-side cord-like parts comprises a joint part extending in a Z-axis direction perpendicular to said first and second shaft centers and extending along a tangential line of the first circular surface part and the second circular surface part, a winding part connecting to the joint part wound on the first circular surface part immovably in relation to the first circular surface part, a twining part connecting to the joint part and wound on the second circular surface part; and the one-side and other-side twining parts interconnect each other.

6. The multiple wheel vehicle as set forth in claim 5, characterized in that said change-direction member comprises an oval-like body which has two second shaft centers located on both right and left sides thereof and comprises one-side second circular surface part defined as a circular surface part formed around one-side second shaft center on one side of the right and left sides of the center of circular arc, and other-side second circular surface part defined as a circular surface part formed around other side second shaft center on another side of the right and left sides of the center of circular arc.

7. The multiple wheel vehicle as set forth in claim 6, characterized in that the oval-like body forming said change-direction member is fixed disably tilting.

8. The multiple wheel vehicle as set forth in claim 5, characterized in that the change-direction member comprises two second shaft centers located on both right and left sides thereof, and the change-direction member is made of two, one-side and other-side, disk-like bodies having the one-side and other-side second shaft centers defined as respective centers of the circular arc.

9. The multiple wheel vehicle as set forth in claim 8, characterized in that said two disk-like bodies forming said change-direction member are pivotably supported around the respective second shaft centers tiltably.

10. The multiple wheel vehicle as set forth in claim 8, characterized in that said two disk-like bodies forming said change-direction member are fixed around the respective second shaft centers disably tilting.

11. The multiple wheel vehicle as set forth in claim 9 or 10, characterized in that the one-side and other-side twining parts of said cord-like body are connected to each other with a cushion spring.

12. The multiple wheel vehicle as set forth in claim 1 or 5, characterized in that said change-direction member comprises a single second shaft center, and circular surface parts formed on both sides of the center of circular arc around the second shaft center is defined as one-side and other-side second circular surface parts.

13. The multiple wheel vehicle as set forth in claim 12, characterized in that said change-direction member is supported tiltably around said second shaft center.

14. The multiple wheel vehicle as set forth in claim 12, characterized in that said change-direction member is fixed disably tilting.

* * * * *